(12) United States Patent
Marth

(10) Patent No.: US 9,241,243 B1
(45) Date of Patent: Jan. 19, 2016

(54) STEP TRIANGULATION

(71) Applicant: Del Marth LLC, Rocklin, CA (US)

(72) Inventor: Ehrien Marth, Rocklin, CA (US)

(73) Assignee: Del Marth LLC, Rocklin, CA (US)

( * ) Notice: Subject to any disclaimer, the term of this patent is extended or adjusted under 35 U.S.C. 154(b) by 0 days.

(21) Appl. No.: 14/696,089

(22) Filed: Apr. 24, 2015

(51) Int. Cl.
*H04W 4/02* (2009.01)
*H04W 56/00* (2009.01)
*G01S 5/02* (2010.01)

(52) U.S. Cl.
CPC ............ *H04W 4/023* (2013.01); *G01S 5/0289* (2013.01); *H04W 56/001* (2013.01)

(58) Field of Classification Search
CPC ... H04W 4/023; H04W 56/001; H04W 64/00; H04W 52/0248; G01S 5/0289; G01S 5/0252; G01S 5/0226; G01S 5/0242
See application file for complete search history.

(56) References Cited

U.S. PATENT DOCUMENTS

| | | | | |
|---|---|---|---|---|
| 7,260,408 | B2 * | 8/2007 | Friday et al. ............... | 455/456.1 |
| 2004/0157622 | A1 * | 8/2004 | Needham .................... | 455/456.1 |
| 2014/0038160 | A1 * | 2/2014 | Shani et al. .................... | 434/353 |
| 2014/0162701 | A1 * | 6/2014 | Jellinek et al. ............. | 455/456.6 |
| 2015/0094100 | A1 * | 4/2015 | Opshaug et al. ........... | 455/456.5 |

* cited by examiner

*Primary Examiner* — Brandon Miller

(74) *Attorney, Agent, or Firm* — Novak Druce Connolly Bove + Quigg LLP

(57) ABSTRACT

A computing device can determine an estimated location of a target computing device based on historical signal readings describing wireless communication signals received from the target computing device. A signal reading can include data such as a signal strength value indicating the received signal strength of the wireless communication signal, a timestamp value and a geographic coordinate value indicating the location of a receiving computing device when the wireless communication signal was received. The signal readings can describe wireless communication signals received from the target computing device by one or more receiving computing devices and received during various times. The computing device can calculate the estimated location of the target computing device by triangulating the location of the target computing device based on the geographic coordinate value and signal strength value of three signal readings selected from the set of signal readings.

18 Claims, 18 Drawing Sheets

STEP TRIANGULATION

TECHNICAL FIELD

The present technology pertains to determining an estimated location of a target computing device, and more specifically pertains to determining the estimated location of the target computing device based on historical signal readings.

BACKGROUND

Current computing devices can include functionality to communicate with each other via wireless communication signals. For example, many computing devices are enabled to send and receive wireless communication signals using wireless technology standards such as Bluetooth®. Wireless communication signals sent between computing devices can include data identifying the transmitting computing device, such as a unique device identifier assigned to the transmitting computing device, as well as other desired data for transfer, such as data defining specific commands, streamed content, etc.

In addition to transmitting data between computing devices, wireless communication signals can also be used to determine the geographic distance between computing devices. For example, a received signal strength indicating the strength of a wireless communication signal received by a receiving computing device can be used to estimate the distance between the receiving computing device and a transmitting computing device that transmitted the wireless communication signal. A weak received signal strength can indicate a relatively longer geographic distance between the transmitting and receiving computing devices, whereas a strong received signal strength can indicate a relatively shorter geographic distance between the transmitting and receiving computing devices.

Current technologies utilize signal strength to help users locate a target computing device. For example, a receiving computing device can notify the user as to whether the wireless communication signal received from a target computing device is getting stronger or weaker as the user changes geographic location. A user can use the changes in signal strength to determine the location of the target computing device. While this provides the user with some guidance regarding the location of the target computing device, the user is still required to determine the location through trial and error by moving in multiple directions and viewing the resulting change in signal strength.

Other technologies attempt to provide a precise location of a target computing device using triangulation. For example, the signal strength of wireless communication signals received by three or more computing devices from the target computing device can be used to triangulate the location of the target computing device. While these types of systems can provide a much more precise location for the target computing device, they require simultaneous signal readings from multiple computing devices. Accordingly, the data required to utilize this technique likely will not be available to a user that does not have a network of multiple computing devices within an appropriate proximity of the target computing device.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by practice of the principles set forth herein.

Disclosed are systems, methods, and non-transitory computer-readable storage media for determining the estimated location of a target computing device based on historical signal readings. A computing device can determine an estimated location of a target computing device based on historical signal readings describing wireless communication signals received from the target computing device. A signal reading can include data such as a signal strength value indicating the received signal strength of the wireless communication signal, a timestamp value indicating a time at which the wireless communication signal was received and a geographic coordinate value indicating the location of a receiving computing device when the wireless communication signal was received.

The signal readings can describe wireless communication signals received from the target computing device by one or more receiving computing devices and received during various times. For example, multiple receiving computing devices can receive wireless communication signals from the target computing device throughout each day and generate signal readings describing the received wireless communication signals for later use. This can include storing the signal readings locally in memory on the receiving computing device and/or in a cloud based data storage accessible to multiple computing devices.

To determine the estimated location of a target computing device, a computing device can gather a set of signal readings describing wireless communication signals received from the target computing device. The computing device can then select a subset of the set of gathered signal readings for use in calculating the estimated location of the target computing device. For example, the computing device can calculate the estimated location of the target computing device by triangulating the location of the target computing device based on the geographic coordinate value and signal strength value of three or more signal readings selected from the set of signal readings.

The computing device can select a subset of signal reading that are determined to provide the most accurate, beneficial, reliable, etc., data. For example, the computing device can select the subset of signal reading based on the timestamp value of the signal readings (e.g., select signal readings with the latest timestamp value). While the selected signal readings may not describe wireless communication signals that have been received simultaneously from the target computing device, the data can still be used to calculate an estimated location of the target computing device.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Figure 1:
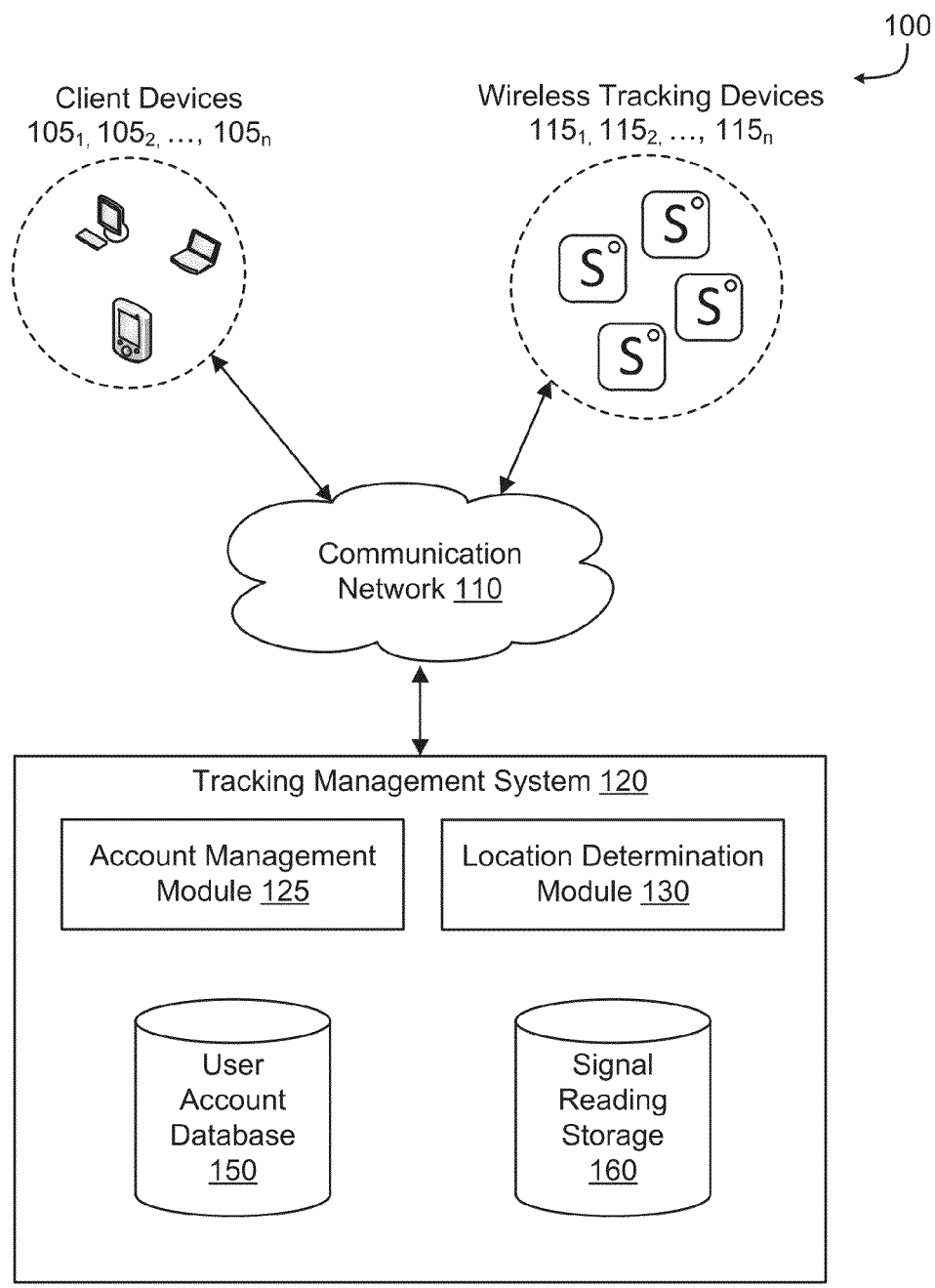
FIG. 1 shows an exemplary configuration of devices and a network in accordance with the invention.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for determining the estimated location of a target computing device based on historical signal readings. A computing device can determine an estimated location of a target computing device based on signal readings describing wireless communication signals received from the target computing device. A signal reading can include data such as a signal strength value indicating the received signal strength of the wireless communication signal, a timestamp value indicating a time at which the wireless communication signal was received and a geographic coordinate value indicating the location of a receiving computing device when the wireless communication signal was received.

The signal readings can describe wireless communication signals received from the target computing device by one or more receiving computing devices and received during various times. For example, multiple receiving computing devices can receive wireless communication signals from the target computing device throughout each day and generate signal readings describing the received wireless communication signals for later use. This can include storing the signal readings locally in memory on the receiving computing device and/or in a cloud based data storage accessible to multiple computing devices.

To determine the estimated location of a target computing device, a computing device can gather a set of signal readings describing wireless communication signals received from the target computing device. The computing device can then select a subset of the set of gathered signal readings for use in determining the estimated location of the target computing device. For example, the computing device can determine the estimated location of the target computing device by triangulating the location of the target computing device based on the geographic coordinate values and signal strength values of the subset of signal readings selected from the set of signal readings.

The computing device can select a subset of signal reading that are determined to provide the most accurate, beneficial, reliable, etc., data for determining the estimated location of the target computing device. For example, the computing device can select the subset of signal readings based on the timestamp value of the signal readings (e.g., select the signal readings with the latest timestamp value). While the selected signal readings may not describe wireless communication signals that have been received simultaneously from the target computing device, the data can still be used to calculate an estimated location of the target computing device.

FIG. 1 illustrates an exemplary system configuration 100, wherein electronic devices communicate via a network and/or directly via wireless communication for purposes of exchanging content and other data. As illustrated, multiple computing devices can be connected to communication network 110 and be configured to communicate with each other through use of communication network 110.

Communication network 110 can be any type of network, including a local area network ("LAN"), such as an intranet, a wide area network ("WAN"), such as the internet, or any combination thereof. Further, communication network 110 can be a public network, a private network, or a combination thereof. Communication network 110 can also be implemented using any number of communication links associated with one or more service providers, including one or more wired communication links, one or more wireless communication links, or any combination thereof. Additionally, communication network 110 can be configured to support the transmission of data formatted using any number of protocols. Additionally, the computing devices can also communicate with each other directly via wireless communication signals using wireless technology standards such as Bluetooth®.

A computing device can be any type of general computing device capable of network communication with other computing devices. For example, a computing device can be a personal computing device such as a desktop or workstation, a business server, or a portable computing device, such as a laptop, smart phone, or a tablet PC. A computing device can include some or all of the features, components, and peripherals of computing device 800 of FIGS. 8A and 8B.

A computing device can also be a wireless tracking device configured primarily to send and receive wireless communication signals with other computing devices. For example, a computing device can be a Bluetooth® tracking device, such as wireless tracking device 700 of FIGS. 7A-7H.

To facilitate communication with other computing devices, a computing device can also include a communication interface configured to receive a communication, such as a request, data, etc., from another computing device in network and/or direct wireless communication with the computing device and pass the communication along to an appropriate module running on the computing device. The communication interface can also be configured to send a communication to another computing device in network and/or direct wireless communication with the computing device.

In system 100, a user can track the location of one or more of wireless tracking devices $115_1$, $115_2$, ..., $115_n$ (collectively "115") through use of client devices $105_1$, $105_2$, ..., $105_n$ (collectively "115") and/or tracking management system 120.

A wireless tracking device $115_i$ can be any type of computing device configured to communicate with another computing device by transmitting and receiving wireless communication signals. For example, a wireless tracking device $115_i$ can be a Bluetooth® tracking device configured primarily to transmit and receive wireless communication signals using the Bluetooth® wireless technology standard.

While a wireless tracking device can be any type of computing device capable of communicating with another computing device by transmitting and receiving wireless communication signals, a wireless tracking device $115_i$ can also be a computing device designed with the primary intent of being attached to items for tracking purposes. Accordingly, a wireless tracking device $115_i$ can be designed to be relatively small in size so that it can be easily attached to items, such as keys, wallets, remote controls, children, etc. To provide a reduced size, a wireless tracking device $115_i$ can be designed to include fewer and smaller components than traditional computing devices. For example, a wireless tracking device $115_i$ can be designed to exclude many or all components that are not necessary to facilitate the desired functionality of the wireless tracking device $115_i$ (e.g., using wireless communication signals to communicate with other computing devices).

A client device $105_i$ can by any type of computing device configured to transmit and receive wireless communication signals, such as desktop computers; mobile computers; mobile communications devices (e.g. mobile phones, smart phones, tablets, etc.); smart televisions; set-top boxes, etc. Client devices 105 can be of varying type, capabilities, operating systems, etc.

Client devices 105 can be configured to communicate with one or more of wireless tracking devices 115 via wireless communication. For example, a user can pair a client device $105_i$ to one or more of wireless tracking devices 115 to receive wireless communication signals from the paired wireless tracking devices 115. Alternatively, a client device $105_i$ can receive wireless communication signals from all wireless tracking devices 115 within range of client device $105_i$. Likewise, a client device $105_i$ can transmit wireless communication signals to one or more of wireless tracking devices 115.

A wireless communication signal can be a signal transmitted from one computing device that can be received by another computing device. For example, a wireless communication signal can be a wireless signal transmitted from an antenna of a transmitting computing device which can be received by an antenna of a receiving computing device that is within range to receive the wireless communication signal.

A wireless communication signal can be a signal sent using a wireless technology standard such as Bluetooth®. Further, a wireless communication signal can include metadata identifying the transmitting computing device. For example, a wireless communication signal can include a unique device identifier that identifies the transmitting computing device.

In some embodiments, wireless tracking devices 115 can be configured to continuously or repeatedly transmit or broadcast wireless communication signals which can be received by client devices 105 within range to receive the wireless communication signal. Further, client devices 105 can transmit a wireless communication signal to a wireless tracking device $115_i$ prompting the wireless tracking device $115_i$ to transmit a response wireless communication signal.

Client devices 105 can be configured to generate and store signal readings gathered from one or more of wireless tracking devices 115. A signal reading can be a data record describing a wireless communication signal received from a wireless tracking device $115_i$. For example, a signal reading can include a device identifier identifying the wireless tracking device $115_i$ from which the wireless communication signal was received, a signal strength value indicating a measurement of the power present in the received wireless communication signal, a geographic coordinate identifying the location of the client device $105_i$ that received the wireless communication signal and a timestamp value indicating the time at which the client device $105_i$ received the wireless communication signal. A signal reading can also include any other data gathered from any number of components of the client device $105_i$, such as data gathered from a compass component, accelerometer, battery, etc. Client devices 105 can store signal readings in local memory and/or with tracking management system 120.

Tracking management system 120 can be a system comprising of one or more computing devices that are configured to manage wireless tracking devices 115 for multiple user accounts. Tracking management system 120 can support connections from a variety of different types of client devices 105, such as desktop computers; mobile computers; mobile communications devices (e.g. mobile phones, smart phones, tablets, etc.); smart televisions; set-top boxes; and/or any other network enabled computing devices. For example, tracking management system 120 can be accessible to a client device $105_i$ connected to communication network 110 by direct and/or indirect communication. Furthermore, tracking management system 120 can concurrently accept connections from and interact with multiple client devices 105.

Tracking management system 120 can receive signal readings from a plurality of client devices 105 and store the signal reading in signal reading storage 160. Signal reading storage 160 can be a storage device, multiple storage devices, or a server. Alternatively, signal reading storage 160 can be a cloud storage provider or network storage accessible via one or more communications networks. Tracking management system 120 can store the signal readings in a network accessible storage (SAN) device, in a redundant array of inexpensive disks (RAID), etc. Signal reading storage 160 can store signal readings using one or more partition types, such as FAT, FAT32, NTFS, EXT2, EXT3, EXT4, ReiserFS, BTRFS, and so forth.

To facilitate the various tracking management services, a user can create a user account with tracking management system 120. The account information for each created user account can be maintained in user account storage 150. User account storage 150 can store account information for each user account, including a unique account identifier identifying the user account, personal information, username, password, email address, home address, credit card information, banking information, etc. Account information can also include tracking management information, such as device identifiers identifying client device 105 and wireless tracking devices 115 associated with the user account, security settings, personal configuration settings, etc.

A user account can be used to manage wireless communication devices 115. For example, tracking management system 105 can enable a user to add wireless tracking devices 115 to their user account. To add a wireless tracking device $115_i$ to a user account, tracking management system 105 can add a device identifier identifying the wireless tracking device $115_i$ to the user account.

Signal reading storage 160 can also store metadata describing signal readings and the relationship of the signal readings to various user accounts. The metadata for a signal reading can be stored as part of the signal reading or can be stored separately.

Tracking management system 120 can include account management module 125 configured to manage and access each user account. For example, account management module 125 can be configured to communicate with user account database 150 and signal reading storage 160 to adjust privileges and otherwise manage the user accounts and corresponding signal readings.

Further, account management module 125 can manage signal readings for wireless tracking devices 115 associated with the user accounts. For example, account management module 125 can provide a client device $105_i$ authorized to access a user account with signal readings gathered from wireless tracking devices 115 associated with the user account. Account management module 125 can use the account identifiers assigned to the user account to identify corresponding signal readings in signal reading storage 160. Account management module 125 can then provide some or all of the identified signal readings to the client device $105_i$.

Figure 2:
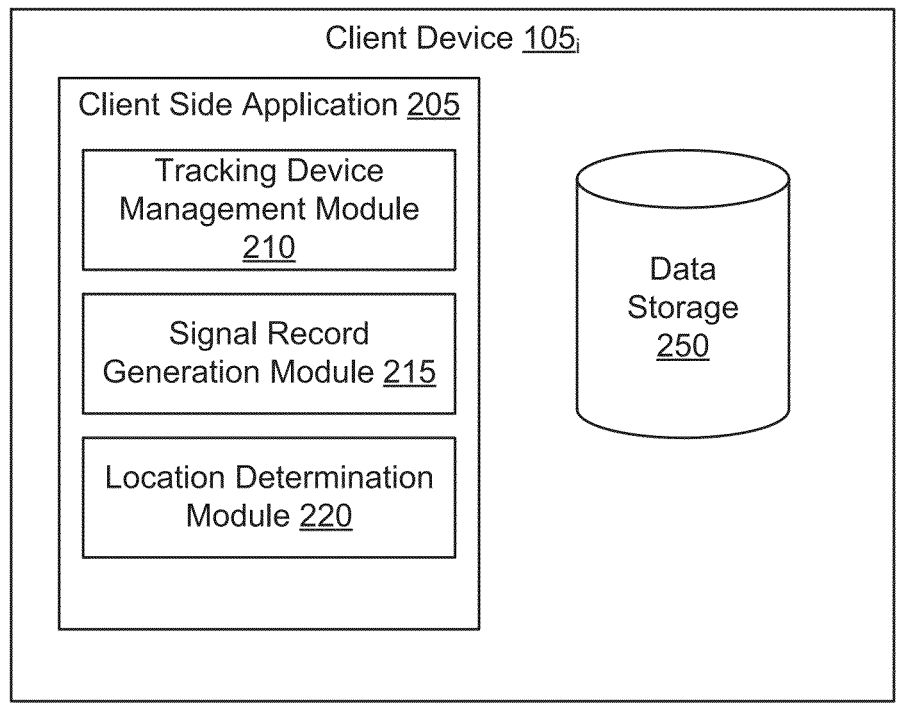
FIG. 2 shows an embodiment of a client device configured to track wireless communication devices.

FIG. 2 shows an embodiment of a client device configured to track wireless communication devices. FIG. 2 is described in view of the system shown in FIG. 1. As shown, client side application 205 can be installed on client device $105_i$. Client side application 205 can be an application configured to enable client device $105_i$ to track one or more wireless tracking devices 115. Client side application 205 can be a tracking specific application, such as a stand-alone application, one or more application plug-ins, and/or a browser extension configured to track wireless communication devices 115. Client side application 205 can also be a third-party application, such as a web browser, that resides on client device $115_i$ and is configured to communicate with tracking management system 120. In either case, client-side application 205 can present a user interface (UI) for the user to track the location of one or more wireless communication devices 115. Further, client device $105_i$ can include data storage 250 configured to maintain data utilized by client side application 205.

Client side application 205 can include tracking device management module 210 configured to enable a user to manage one or more wireless tracking devices $115_i$. For example, tracking device management module 210 can present a user with a tracking device management interface that enables a user to perform multiple functions, such as adding and removing wireless tracking devices to the user's account, modify settings, etc.

In some embodiments, tracking device management module 210 can enable a user to add wireless tracking devices 115 to the user's account. Wireless tracking devices 115 added to the user's account can be tracked for the user. This can include, generating and storing wireless signal readings gathered from the added wireless tracking devices 115 as well as determining and presenting an estimated location of the wireless tracking devices.

To enable a user to add a wireless tracking device $105_i$ to the user's account, tracking device management module 210 can present the user with data identifying wireless tracking devices 115 that are detected by client device $105_i$ and that are eligible to be tracked. For example, tracking device management module 210 can retrieve device identifiers from wireless communication signals received by client device $105_i$ and present the wireless identifiers to the user. Tracking device management module 210 can also present the user with user interface elements, such as buttons, enabling the user to select to add one or more of the presented wireless communication devices 105 to the user's account.

In some embodiments, tracking device management module 210 can present all detected wireless tracking devices 105 as being eligible to be added to the user's account. Alternatively, in some embodiments, tracking device management module 210 can present only wireless tracking devices 115 transmitting a wireless communication signal indicating that the wireless tracking device $115_i$ is eligible to be added to the user's account. For example, a wireless tracking device $105_i$ can include an input device, such as a physical button, nob, lever, etc., that, when actuated, causes the wireless tracking device $115_i$ to transmit a wireless communication signal indicating that the wireless tracking device $115_i$ is eligible to be added to the user's account.

In some embodiments, tracking device management module 210 can present only wireless tracking devices 115 within a specified distance of client device $105_i$. Tracking device selection module 210 can determine the distance of a wireless tracking device $115_i$ based on the signal strength value of a wireless communication signal received from the wireless tracking device $115_i$.

Upon receiving a user input selecting one or more of the available wireless tracking devices, tracking device management module 210 can add the identified wireless tracking devices 115 to the user's account. For example, tracking device management module 210 can provide the device identifier to tracking management system 120 to be added to the user's account. Further, tracking device management module 210 can record the device identifier of the selected wireless tracking device in data storage 250, thereby indicating that the corresponding wireless tracking device $115_i$ has been added to the user's account.

Client-side application 205 can further include signal reading generation module 215 configured to generate signal readings. A signal reading can be a data record describing a wireless communication signal received from a wireless tracking device $115_i$. For example, a signal reading can include a device identifier identifying the wireless tracking device $115_i$ from which the wireless communication signal was received, a signal strength value indicating a measurement of the power present in the received wireless communication signal when it was received by client device $105_i$, a geographic coordinate identifying the location of client device $105_i$ when the wireless communication signal was received and a timestamp value indicating the time at which client device $105_i$ received the wireless communication signal.

To generate a signal reading, signal reading generation module 215 can be configured to communicate with multiple components of client device $105_i$ to gather the necessary data. For example signal reading generation module 215 can gather the device identifier and a signal strength value for a received wireless communication signal from the received wireless communication signal. Signal reading generation module 215 can also gather the time when the wireless communication signal was received and the geographic coordinates of client device $105_i$ when the wireless communication signal was received. Signal reading module 205 can gather the geographic coordinates of client device $105_i$ from a Geographic Positioning System (GPS) component of client device 105 and the time from an internal clock of client device 105.

A signal reading can also include data gathered from an accelerometer or compass component of the client device $105_i$. For example, data gathered from a compass and accelerometer can provide a direction in which client device $105_i$ is facing/moving and be used to derive the relative direction of a wireless tracking device $115_i$ from client device $105_i$.

Signal reading generation module 215 can use the gathered data to generate a signal readings describing the wireless communication signals. Signal reading generation module 215 can store the generated signal readings in data storage 250. Further, signal reading generation module 215 can transmit the generated signal readings to tracking management system 120, where they can be stored in signal reading storage 160. In some embodiments, a signal reading can be stored on a wireless tracking device $115_i$. For example, a client device $105_i$ can transmit the signal readings to the wireless tracking device $115_i$ for storing. Alternatively, a wireless tracking device $115_i$ can generate signal readings from wireless communication signals received from other wireless tracking device 115 and/or client devices 105 and store the signal readings, as well as provide them to other computing devices (e.g., client devices 105, wireless tracking devices 115 and/or tracking management system 120).

In some embodiments, a user's client device $105_i$ can be configured to track only wireless tracking devices 115 assigned to the user's account. For example, signal reading generation module 215 can generate signal readings gathered from wireless tracking devices 115 that are associated with a user account authorized on the client device $105_i$. Signal reading generation module 215 can gather device identifiers identifying the wireless tracking devices 115 associated with the user account from data storage 250 and/or tracking management system 120 and use the device identifiers to determine the wireless tracking devices 115 associated with the user's account. Signal reading generation module 215 can then generate signal readings gathered from the identified wireless tracking devices 115.

In some embodiments, a user's client device $105_i$ can be configured to track wireless tracking devices 115 that are not assigned to the user's account as well as wireless tracking devices 115 that are assigned to the user's account. For example, signal reading generation module 215 can generate a signal reading for a wireless communication signal gathered from a wireless tracking device $115_i$ regardless of whether or not the wireless tracking device $115_i$ is associated with the user's account. As a result, a greater number of signal readings can be gathered from each wireless tracking device 115.

In some embodiments, signal reading generation module 215 can generate signal readings for wireless communication signals received from any wireless tracking devices 115 in communication with client device $105_i$.

Alternatively, in some embodiments, signal reading generation module 215 can generate signal readings for only wireless communication signals received from predetermined types of wireless tracking devices 115 and/or wireless tracking devices 115 associated with a specified manufacturer. For example, signal reading generation module 215 can generate signal readings for only wireless tracking devices 115 associated with the manufacturer that maintains and/or provides tracking management system 120. Hence, signal reading generation module 215 will not generate signal readings for wireless communication signals received from wireless tracking devices 115 that are not of the predetermined type and/or associated with the specified manufacturer.

In some embodiments, signal reading generation module 215 can determine the type and/or manufacturer of a wireless tracking device $115_i$ from a wireless communication signal received from the wireless tracking device $115_i$. For example, a wireless communication signal can include an identifier identifying the type and/or manufacturer of a wireless tracking device $115_i$ that transmitted the wireless communication signal. Alternatively, the type and/or manufacturer of a wireless tracking device $115_i$ can be determined from the device identifier identifying the wireless tracking device $115_i$. For example, certain types of wireless tracking devices 115 and/or wireless tracking devices 115 from a specified manufacturer can be assigned device identifiers that identify the specified type and/or manufacturer.

In some embodiments, signal reading generation module 215 can generate signal readings according to user specified preferences. For example, a user can select to have the client device $105_i$ only generate signal readings gathered from wireless tracking devices 115 associated with the user's account or, alternatively, from wireless tracking devices 115 associated with the user's account and/or not associated with the user's account.

In some embodiments, signal reading generation module 215 can be configured to store each generated signal readings in data storage 250 as well as transmit the signal readings to tracking management system 120 for storage. Alternatively, signal reading generation module 215 can be configured to only locally store in data storage 250, signal readings gathered from wireless communication devices 115 that are associated with the user's account, and store signal readings gathered from both wireless tracking devices 115 that are associated with the user's account and wireless tracking devices 115 that are not associated with the user's account on tracking management system 120. Hence, in this type of embodiment, signal readings gathered from wireless tracking devices 115 that are not associated with the user's account will not be stored locally on client device $105_i$.

In some embodiments, signal reading generation module 215 can generate a signal reading according to a specified schedule. For example, signal reading generation module 215 can generate signal readings according to a time based schedule such as every 10 seconds, 30 seconds, 1 minute, 3 minutes, etc. The frequency at which signal reading generation module 215 generates signal readings can be set by a user and/or predetermined by developers of client-side application 205.

In some embodiments, signal reading generation module 215 can vary the frequency at which signal readings are generated based on one or more factors, such as remaining battery life for client device $105_i$. For example, signal reading generation module 215 can reduce the frequency at which signal reading are generated when battery life is below a predetermined threshold.

In some embodiments, signal reading generation module 215 can vary the frequency at which signal readings are generated based on time of day. For example, signal reading generation module 215 can generate signal readings more frequently during daytime hours when items are more likely to be moved. Likewise, signal reading generation module 215 can generate signal readings at a less frequent rate during night hours when people are often sleeping.

In some embodiments, signal reading generation module 215 can generate signal readings based on a determined change in signal strength value. For example, signal reading generation module can determine whether a difference between a signal strength value of a wireless communication signal and a previous signal reading gathered from the wireless tracking device $115_i$ is greater than a predetermined threshold value. If signal reading generation module 215 determines that the change meets or exceeds the threshold value, signal reading generation module 215 can generate a signal reading describing the wireless communication signal. Alternatively, if signal reading generation module 215 determines that the change does not meet or exceeds the threshold value, signal reading generation module 215 will not generate a signal reading, thereby reducing generation of duplicate signal readings.

In some embodiments, signal reading generation module 215 can generate signal readings based on a determined location change of client device $105_i$. For example, signal reading generation module 215 can generate a signal reading upon a determination that the geographic location of client device $105_i$ has changed beyond a threshold value. This can be based off of GPS data gathered from a GPS component of client device $105_i$ and/or data gathered from n accelerometer of client device $105_i$. As a result, signal reading generation module 215 will generate new signal readings when client device $105_i$ moves to a new location.

Conversely, signal reading generation module 215 can forego generating a signal reading if the geographic location of client device $105_i$ has not changed beyond a threshold value from the geographic location associated with the previous signal reading. This can reduce generation of duplicate signal readings. Wireless tracking devices 115 can provide data to each other regarding their signal strength in relation to each other and only send out a trigger or notification that the values are different or have changed. Thus, indicating movement of one or more of the devices. This data can be shared with the client device or the cloud directly through a minimum of 1 device acting as a hub or a "master-unit"

Client device $105_i$ can further include location determination module 220 configured to determine an estimated location of a wireless tracking device $115_i$ and provide the user with the estimated location of the wireless tracking device $115_i$. For example, location determination module 220 can present the user with a tracking interface that enables the user to view the estimated location of a wireless tracking device $115_i$. For example, the tracking interface can present a map and the estimated location of one or more wireless tracking devices 115 on the map. Alternatively, the tracking interface can present directional indicators, such as arrows, identifying the direction of one or more wireless tracking devices 115. The tracking interface can also present the user with an estimated distance of each of the wireless tracking devices 115 in the corresponding identified direction, thereby providing an estimated location of the wireless tracking devices 115.

Location determination module 220 can determine the estimated location of a wireless tracking device $115_i$ based on signal readings describing wireless communication signals received from the wireless tracking device $115_i$. Location determination module 220 can gather the signal readings from data storage 250 and/or tracking management system 120. For example, location determination module 220 can use the device identifier for a wireless tracking device $115_i$ to identify signal readings gathered from the wireless tracking device $115_i$ in data storage 250. Likewise, location determination module 220 can transmit the device identifier for the wireless tracking device $115_i$ to tracking management system 120, which can be used by tracking management system 120 to identify signal readings gathered from wireless tracking device $115_i$.

The signal readings gathered by location determination module 220 can describe wireless communication signals received by one or more client devices 105 from the wireless tracking device $115_i$ and wireless communication signals received at different times.

In some embodiments, location determination module 220 can gather all signal reading describing wireless communication signals received from the wireless tracking device $115_i$.

Alternatively, in some embodiments, location determination module 220 can gather a subset of the signal reading describing wireless communication signals received from the wireless tracking device $115_i$. For example, location determination module 220 can gather a subset of the reading signals based on the timestamp value associated with the signal readings. For instance, location determination module 220 can gather a subset of the signal reading with the most recent timestamp value (e.g., the 100 most recent signal readings). Alternatively, location determination module 220 can gather only signal readings with a timestamp value that meets or exceeds a predetermined threshold timestamp value. Thus, signal readings with a timestamp value prior to the predetermined threshold timestamp value will not be gathered.

Location determination module 220 can use the signal readings to determine the estimated location of the wireless tracking device $115_i$. In some embodiments, location determination module 220 can use the signal readings to triangulate the estimated location of the wireless tracking device $115_i$. Location determination module 220 can use the signal strength value and geographic coordinate value from a signal reading to determine an estimated distance of the wireless tracking devices $115_i$ from the geographic coordinate where the wireless communication signal was received. Repeating this process for three separate signal readings can result in three separate radiuses describing the estimated distance of the wireless tracking device $115_i$ from three separate geographic locations, which can be used to triangulate the estimated location of the wireless tracking device $115_i$. For example, location determination module can determine the geographic location where the three radiuses intersect and/or nearly intersect, which can be the estimated location of the wireless tracking device $115_i$.

Alternatively, location determination module 220 can use the signal readings to determine the direction of the wireless tracking device $115_i$ in relation to client device $105_i$ as well as the distance of the wireless tracking device $115_i$ from the client device $105_i$. Location determination module 220 can use the signal strength values and geographic coordinate values from one or more signal readings and a current geographic location of client device $105_i$ to determine the direction of the wireless tracking device $115_i$ in relation to client device $105_i$. For example, location determination module 220 can identify a signal reading with the highest signal strength value and then use the geographic coordinates of the identified signal reading in relation to the current geographic location of client device $105_i$ to estimate the direction of the wireless tracking device $115_i$ in relation to client device $105_i$. Further, location determination module 220 can use a signal strength value from a signal reading received at a geographic location similar to or the same as the current geographic location of wireless tracking device $105_i$ to determine the estimated distance of the wireless tracking device $115_i$ from client device $105_i$.

To determine the estimated location of a wireless tracking device $115_i$, location determination module 220 can select one or more of the gathered signal readings that is determined to provide the most accurate, beneficial, reliable, etc., data for determining the estimated location of the wireless tracking device $115_i$. In some embodiments, location determination module 220 can select one or more of the gathered signal readings based on the timestamp values of the signal readings. For example, location determination module 220 can select one or more of the signal readings with the latest timestamp value (e.g., the most recent signal readings).

In some embodiments, location determination module 220 can select signal readings based on the geographic coordinates of the signal readings. For example, when calculating the estimated location of a wireless tracking device $115_i$, it may be desirable to have signal readings describing wireless communication signal received at varying geographic locations rather than signal readings describing wireless communication signals gathered within a close proximity of each other. Accordingly, location determination module 220 can select signal readings to provide data gathered from a variety of geographic locations. For example, location determination module 220 can select signal readings with geographic coordinates that are at least a specified threshold distance apart from each other. As a result, location determination module 220 will not select multiple signal readings within close proximity of each other.

As another example, location determination module 220 can be configured to select at least one signal reading from specified geographic regions in relation to client device $105_i$. This can provide a signal readings from a variety of locations surrounding client device $105_i$.

In some embodiments, location determination module 220 can select signal readings based on the signal strength values of the signal readings. For example, location determination module 220 can select signal readings with the strongest signal strength values. Alternatively, location determination module 220 can select signal readings to provide a variety of different signal strength values. For example, location determination module 220 can select signal readings that have a difference in signal strength value that meets or exceeds a predetermined threshold difference. Alternatively, location determination module 220 can select at least one signal reading with a signal strength value within each of a set of predetermined signal strength value ranges.

These are just a few examples of how location determination module 220 can select signal readings to determine the estimated location of a wireless tracking device $115_i$ and are not meant to be limiting. It will be appreciated that location determination module 220 can be configured to select signal readings based on any number or combination of factors.

In some embodiments, location determination module 220 can be configured to rank the gathered signal readings and select signal readings based on the ranking. For example, location determination module 220 can rank the signal readings based on any number of factors, such as timestamp value, signal strength value, geographic coordinate, etc. Location determination module 220 can select signal readings that are ranked the highest and/or ranked the highest amongst a certain category of signal readings.

In some embodiments, the estimated location of a wireless tracking device $115_i$ can be determined by tracking management system 120 rather than by client device $105_i$. For example, tracking management system 120 can include location determination module 130 configured to determine the estimated location of a wireless tracking device $115_i$ and provide the estimated location to client device $105_i$. For example, client side application 205 can communicate with tracking management system 120 to request the estimated location of a target wireless tracking device $115_i$. The request can include one or more device identifiers identifying the wireless tracking devices 115. Alternatively, the request can be a request for the estimated location of all wireless tracking devices associated with the user's account.

In response, location determination module 130 can gather signal readings describing wireless communication signals received from the target wireless tracking device(s) 115. Location determination module 1309 can gather the signal readings from signal reading storage 160 and/or from one or more of client devices 105. Location determination module 130 can then use the gathered signal readings to determine the estimated location of the wireless tracking devices 115.

Figure 3:
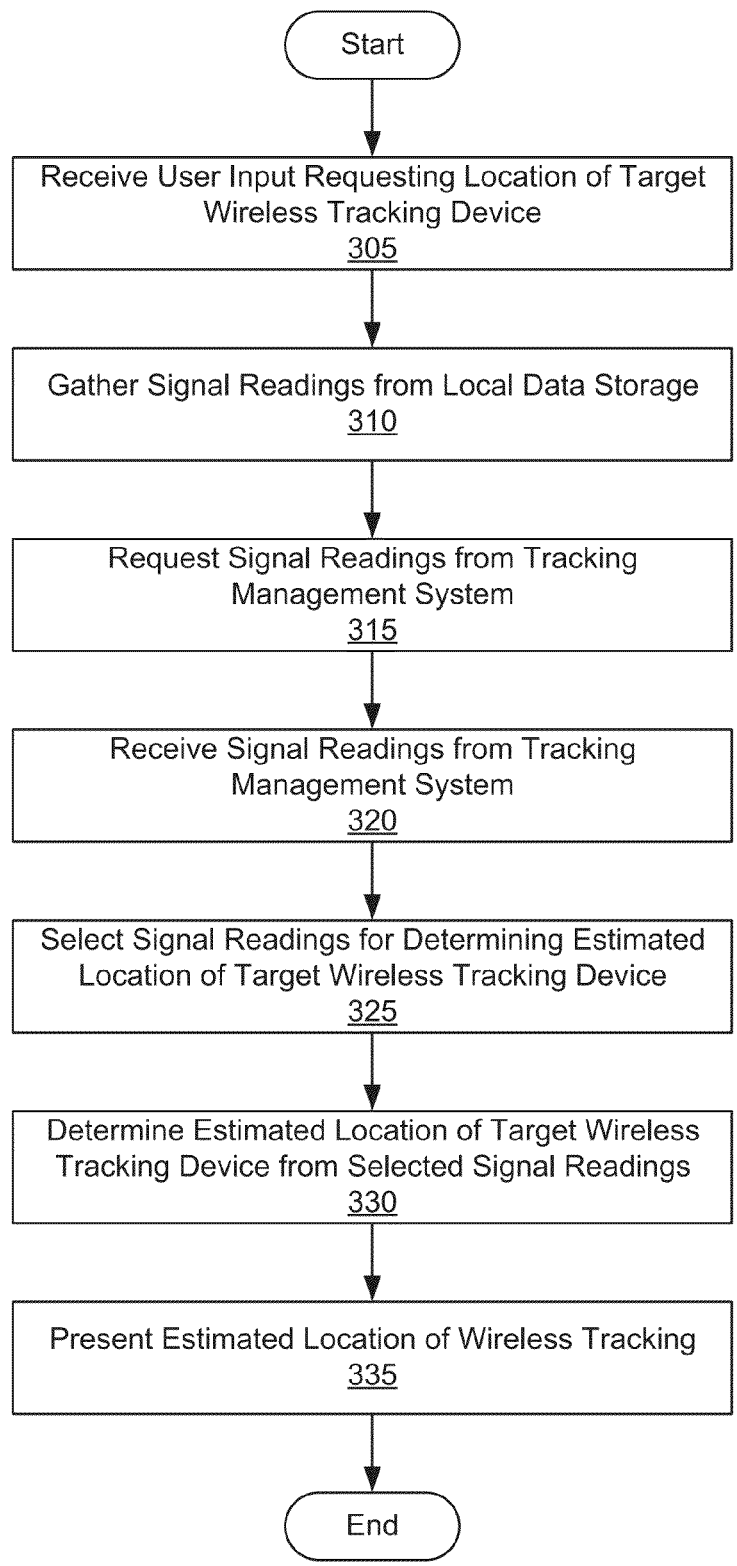
FIG. 3 shows a method of a client device determining the estimated location of a target wireless tracking device.

FIG. 3 shows a method of a client device $105_i$ determining the estimated location of a target wireless tracking device $115_i$. The method shown in FIG. 3 is described in view of the systems shown in FIG. 1 and FIG. 2. Although specific steps are shown in FIG. 3, in other embodiments the method may have more or less steps. Further, the order in which the steps are performed is just one possible embodiment and is not meant to be limiting. The method may be performed in a variety of differing orders, including one or more steps being performed simultaneously, and/or including more or less steps than those shown in FIG. 3.

As shown, the method begins at block 305 where client side application 205 receives a user input requesting the location of a target wireless tracking device $115_i$. Client side application 205 can provide a user of client device $105_i$ with a tracking interface that enables the user to view wireless tracking devices 115 that are assigned to the user's account and view the estimated location of one of more of the wireless tracking devices 115. A user can use the tracking interface to provide an input requesting the location of the target wireless tracking device $115_i$.

At block 310, location determination module 220 gathers signal readings from local data storage, such as data storage 250. For example, location determination module 220 can use the device identifier for the target wireless tracking device $115_i$ to identify signal readings in data storage 250 that describe wireless communication signals received from the target wireless tracking device $115_i$.

At block 315, location determination module 220 can request signal readings from tracking management system 120. Tracking management system 120 can maintain signal readings gathered from multiple client devices 105 and therefore may have signal readings describing signal readings gathered from the target wireless tracking device $115_i$ that were not generated by client device $105_i$ and therefore not available in data storage 250. The request transmitted to tracking management system 120 can include the device identifier for target wireless tracking device $105_i$.

At block 320, client side application 205 can receive signal readings from tracking management system 120, if any were found. For example, tracking management system 120 can return signal readings describing wireless communication signals received from the target wireless tracking device $105_i$ that were not generated by client device $105_i$ and/or not available to client device $105_i$ from data storage 250.

At block 325, location determination module 220 can select signal readings for determining the estimated location of the target wireless tracking device $115_i$. For example, location determination module 220 can select signal reading that are determined to provide the most accurate, beneficial, reliable, etc., data for determining the estimated location of the target wireless communication device $115_i$. Location determination module 220 can select the signal readings based on one or more factors, such as the timestamp values, geographic coordinates and/or signal strength values of the signal readings.

At block 330, location determination module 220 can determine the estimated location of the target wireless tracking device $115_i$ from the selected signal readings. For example, location determination module 220 can use geographic coordinates and signal strength values of the selected signal readings to triangulate the estimated location of the target wireless tracking device $115_i$. Alternatively, location determination module 220 can use geographic coordinates and signal strength values of the selected signal readings to determine a direction and distance of the target wireless tracking device in relation to client device $105_i$.

At block 335, location determination module 220 can present the estimated location of the target wireless tracking device $115_i$. For example, location determination module 220 can present the user with a tracking interface that enables the user to view the estimated location of the target wireless tracking device $115_i$. For example, the tracking interface can present a map and the estimated location of the target wireless tracking device $115_i$ on the map. Alternatively, the tracking interface can present a directional indicator, such as an arrow, identifying the direction of the target wireless tracking devices $115_i$. It should be noted that the estimated location of the target wireless tracking device $115_i$ can be refreshed as it is being presented to the user. For example, client device 105 can gather new signal readings and determine an updated estimated location of the target wireless tracking device $115_i$.

Accordingly, location module 220 can present the updated estimated location of the wireless tracking device 115, to the user.

Figure 4:
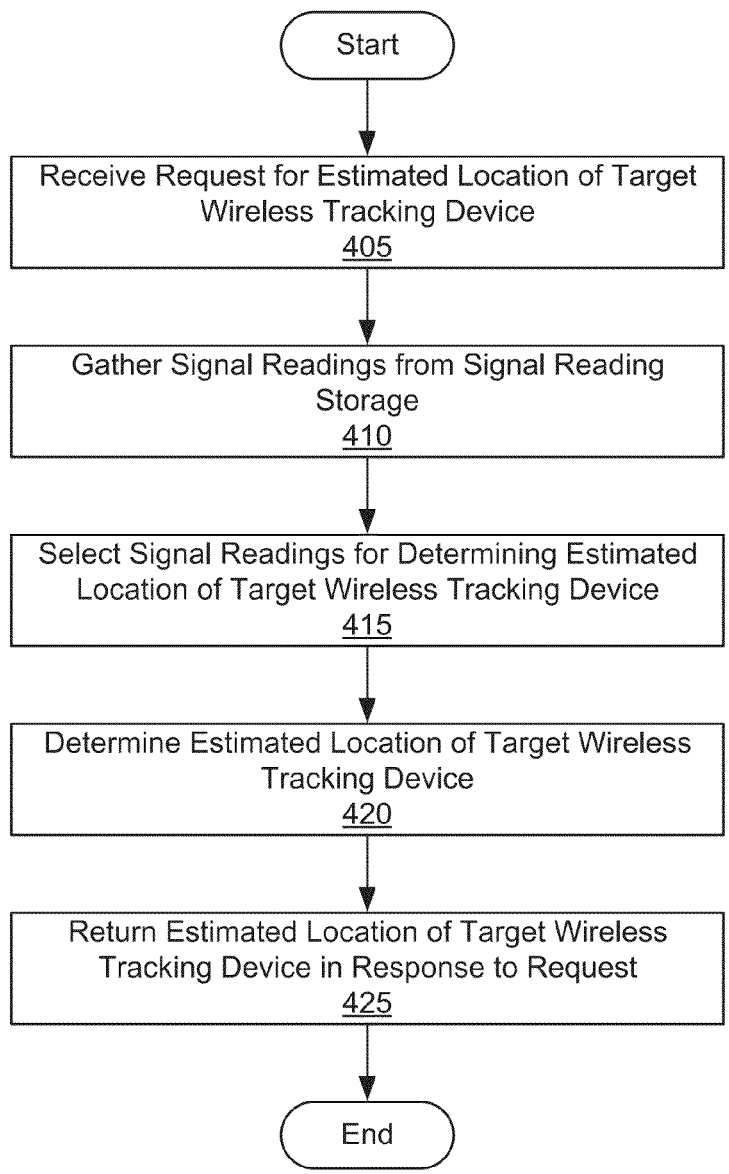
FIG. 4 shows a method of a tracking management system determining the estimated location of a target wireless tracking device.

FIG. 4 shows a method of a tracking management system determining the estimated location of a target wireless tracking device. The method shown in FIG. 4 is described in view of the systems shown in FIG. 1 and FIG. 2. Although specific steps are shown in FIG. 4, in other embodiments the method may have more or less steps. Further, the order in which the steps are performed is just one possible embodiment and is not meant to be limiting. The method may be performed in a variety of differing orders, including one or more steps being performed simultaneously, and/or including more or less steps than those shown in FIG. 4.

As shown, the method begins at block 405 where tracking management system 120 receives a request for the estimated location of a target wireless tracking device $115_i$. The request can be received from a client device $105_i$ in network communication with tracking management system $105_i$. Further, the request can include a device identifier for the target wireless tracking device $115_i$.

At block, location determination module 130 can gather signal readings from signal reading storage 160. For example, location determination module 130 can use the device identifier to identify signal readings describing wireless communication signals describing received from the target wireless tracking device $115_i$. The signal readings can include signal readings generated by and received from multiple client devices 105 and at different times.

At block 415, location determination module 130 can select signal readings for determining the estimated location of the target wireless tracking device $115_i$. For example, location determination module 130 can select signal reading that are determined to provide the most accurate, beneficial, reliable, etc., data for determining the estimated location of the target wireless communication device $115_i$. Location determination module 130 can select the signal readings based on one or more factors, such as the timestamp values, geographic coordinates and/or signal strength values of the signal readings.

At block 420, location determination module 130 can determine the estimated location of the target wireless tracking device $115_i$ from the selected signal readings. For example, location determination module 130 can use geographic coordinates and signal strength values of the selected signal readings to triangulate the estimated location of the target wireless tracking device $115_i$. Alternatively, location determination module 130 can use geographic coordinates and signal strength values of the selected signal readings to determine a direction and distance of the target wireless tracking device in relation to client device $105_i$.

At block 425, location determination module 130 can return the estimated location of the target wireless tracking device $115_i$ in response to the request. For example, location determination module 130 can transmit data identifying the estimated location of the target wireless tracking device $115_i$ to the client device $105_i$ from which the request was received. The client device $105_i$ can use the date to present the user with the estimated location of the target wireless tracking device $115_i$.

Figure 5A:
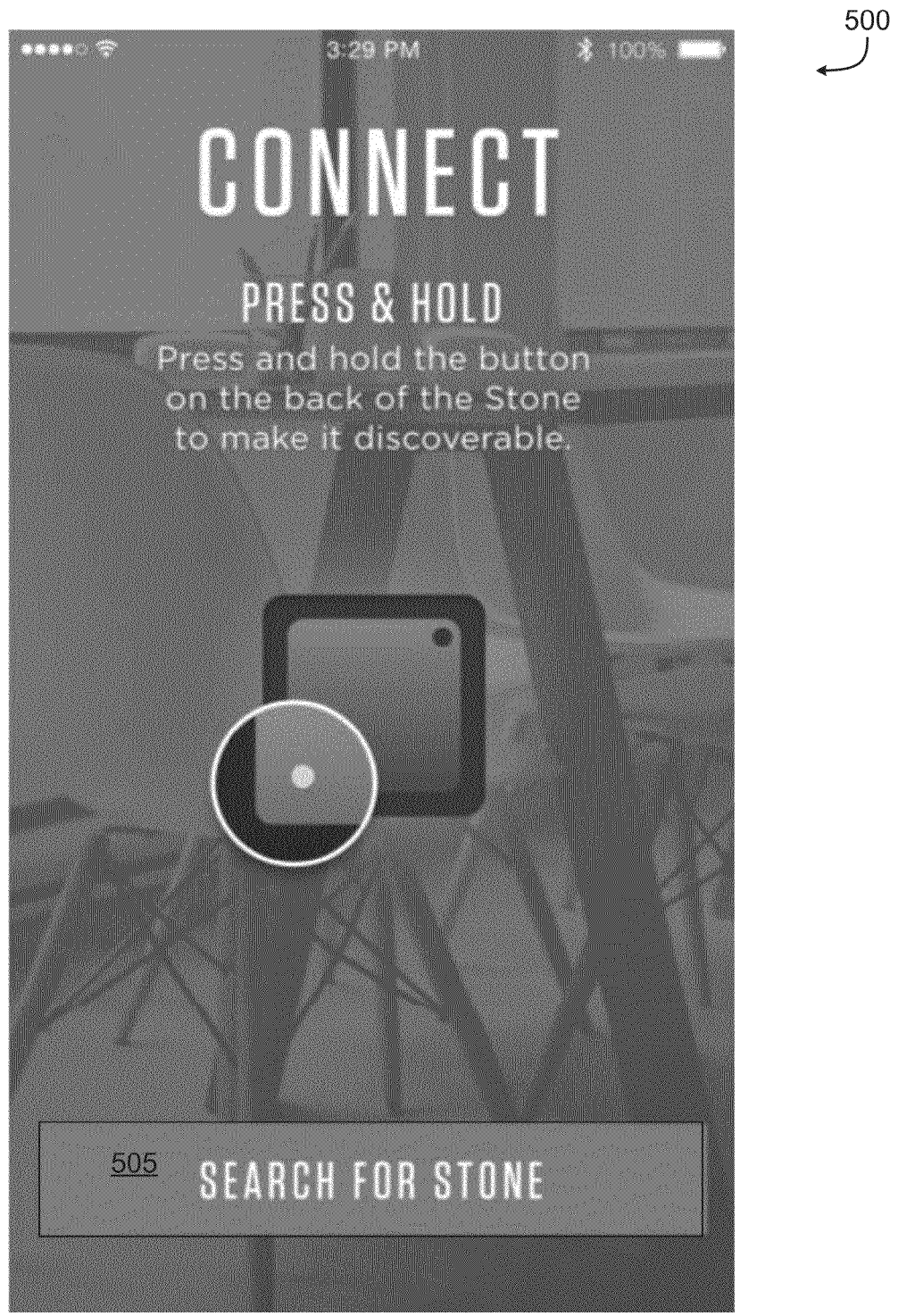
FIGS. 5A-5C show screenshots of a tracking device management interface for adding a wireless tracking device to a user account.
Figure 5B:
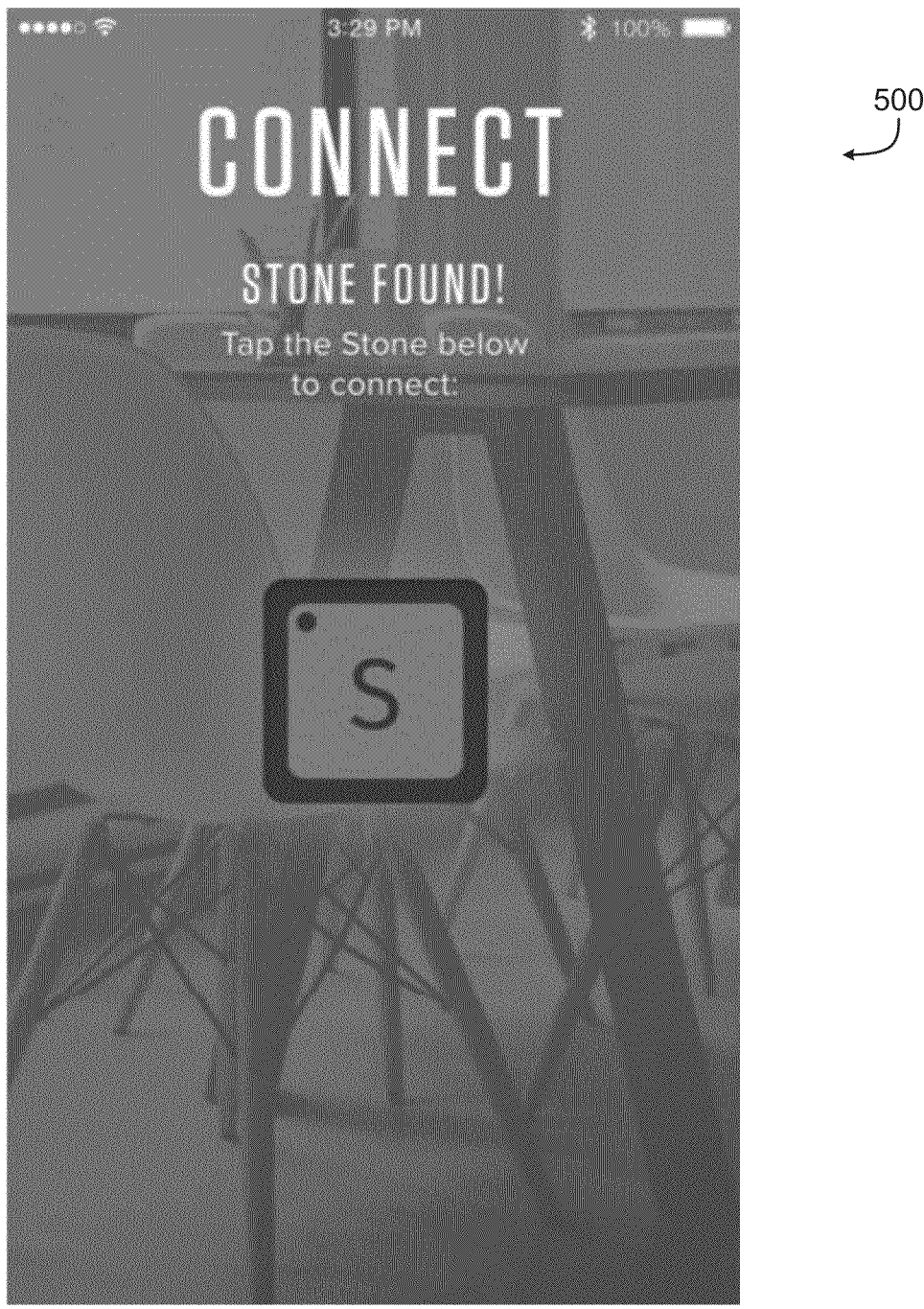
Figure 5C:
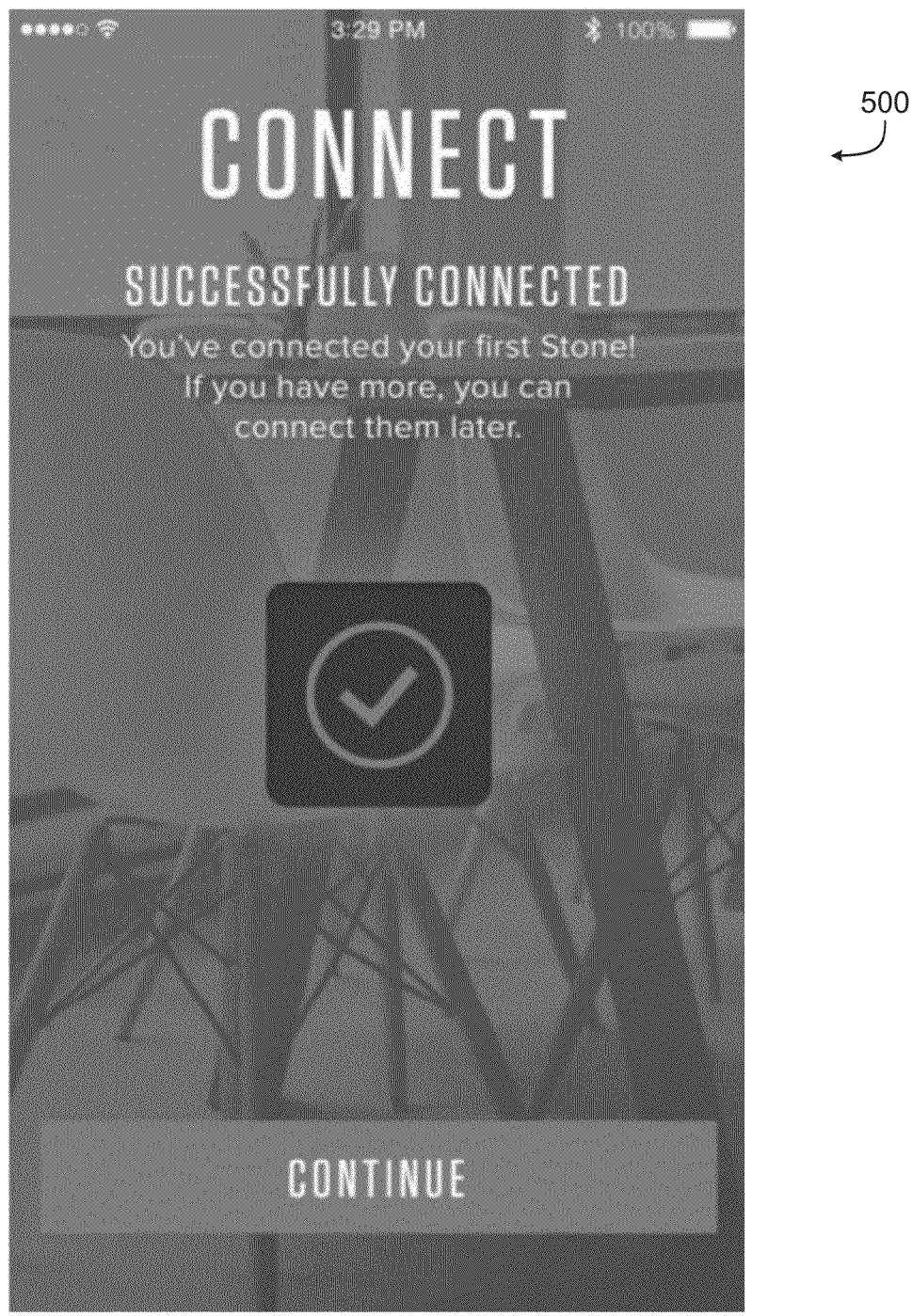

FIGS. 5A-5C show screenshots of a tracking device management interface for adding a wireless tracking device to a user account. As shown in FIG. 5A, the tracking device management interface 500 prompts a user to press and hold a button on a wireless tracking device to add the wireless tracking device to the user's account. Pressing the button can cause the wireless tracking device to transmit a wireless communication signal indicating that the wireless tracking device is eligible to be added to a user account. The tracking device management interface 500 can further include a user interface element 505 that, when selected, can cause the client device to search for eligible wireless tracking devices to add to the user's account. For example, a user can select user the user interface element after pressing the button on their wireless tracking device.

FIG. 5B shows the tracking device management interface 500 as a result of the user selecting user interface element 505. As shown, the tracking device management interface 500 indicates that the wireless tracking device has been detected. The detected wireless tracking device can then be added to the user's account.

FIG. 5C shows the tracking device management interface 500 after the wireless tracking device has been successfully added to the user's account. As shown, the user is presented with a message confirming that the wireless tracking device has been added to the user's account.

Figure 6A:
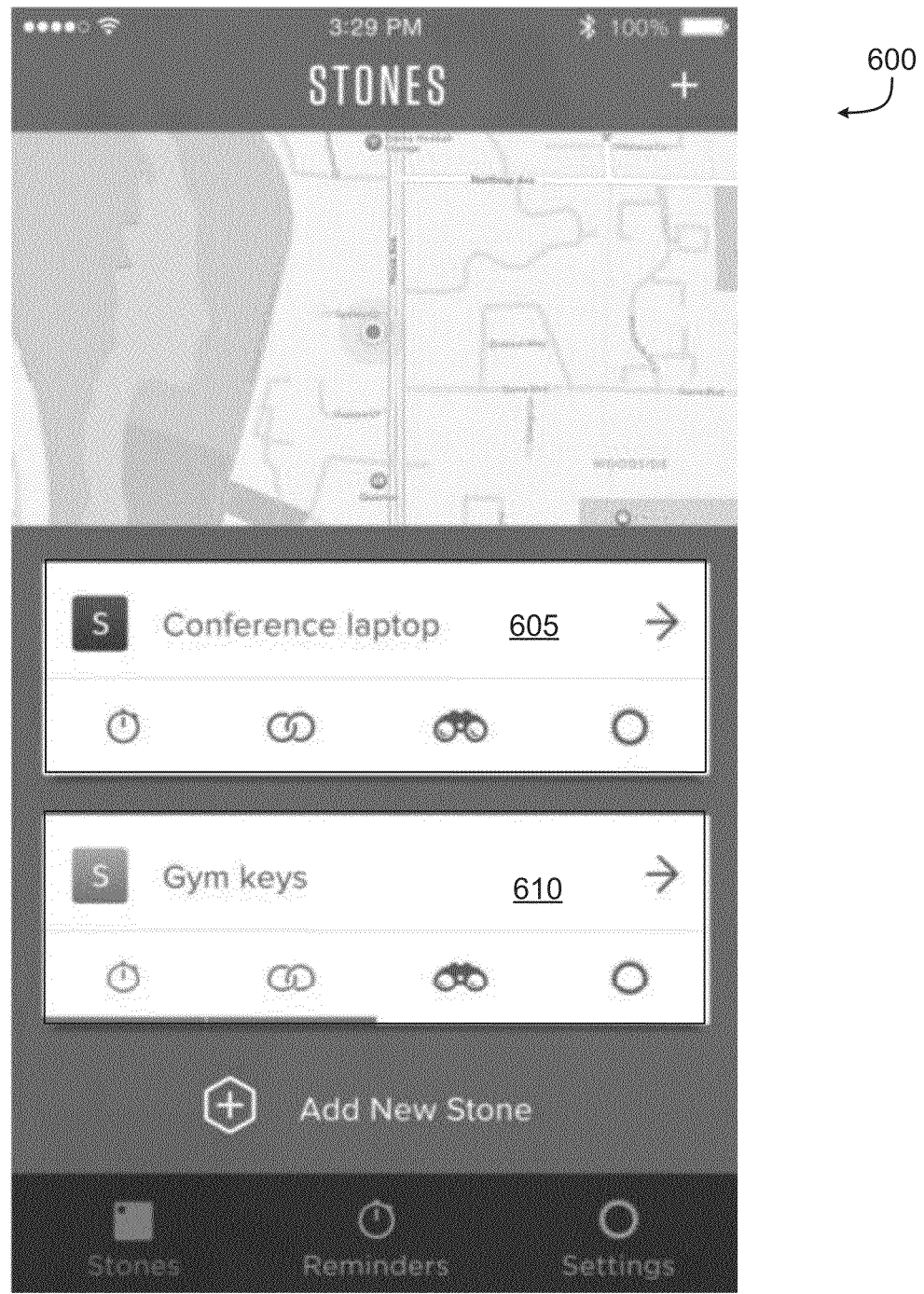
FIGS. 6A and 6B show screenshots of a tracking interface.
Figure 6B:
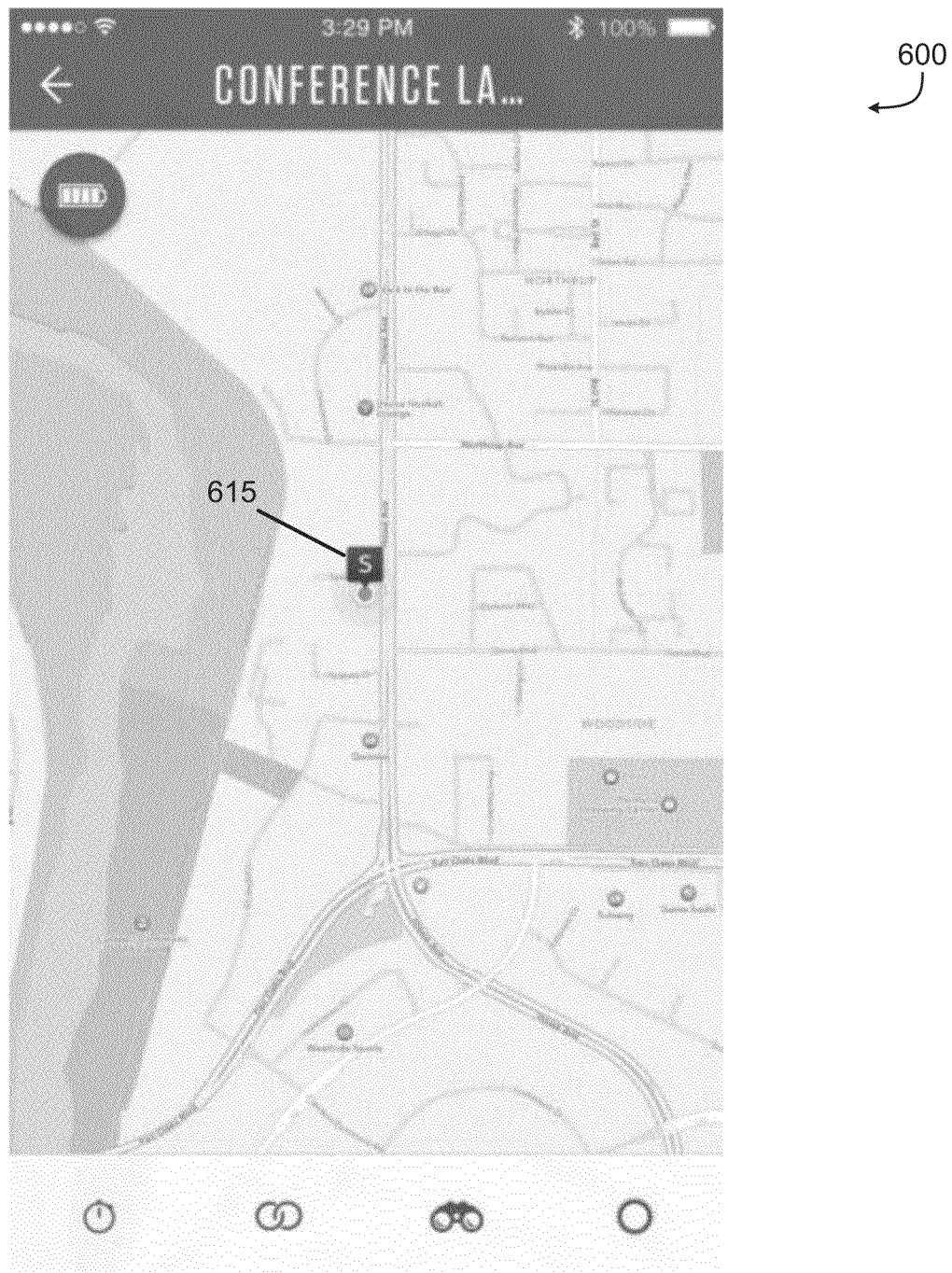

FIGS. 6A and 6B show screenshots of a tracking interface. As shown in FIG. 6A, tracking interface 600 can present the user with visual indicators of the wireless tracking devices added to the user's account. For example, tracking interface 600 includes visual indicator 605 and visual indicator 610, each representing a wireless tracking device assigned to the user's account. Further, visual indicator 605 and visual indicator 610 can be selectable to enable a user to select to view the estimated location of the wireless tracking device corresponding to the visual indicator.

FIG. 6B shows a screenshot of tracking interface 600 as a result of a user selecting one of visual indicator 605 or visual indicator 610 to view of the estimated location of the corresponding wireless tracking device. As shown, the tracking interface 600 presents the user with a map and includes location indicator 615. Location indicator 615 represents the estimated location of the wireless tracking device.

Figure 7A:
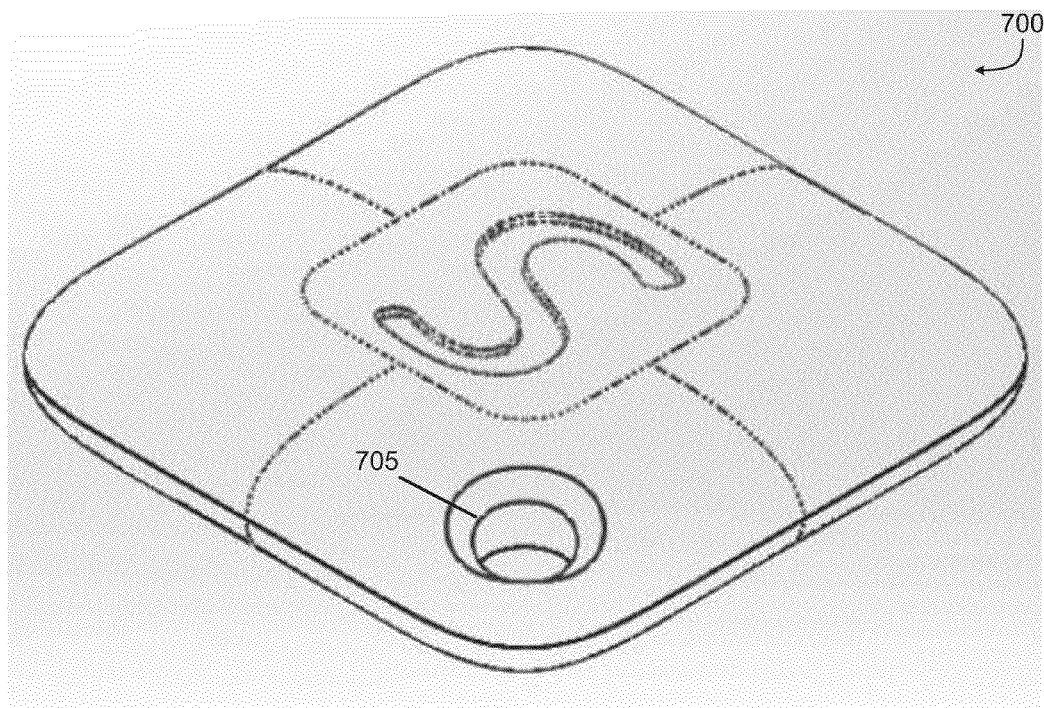
FIGS. 7A-7H show a wireless tracking device.

FIGS. 7A-7H show a wireless tracking device. As shown in FIG. 7A, wireless tracking device 700 can be designed to be a small simple device to facilitate attaching the wireless tracking device 700 to items for tracking. Wireless tracking device 700 can include opening 705 to facilitate attaching wireless tracking device 700 to items.

Figure 7B:
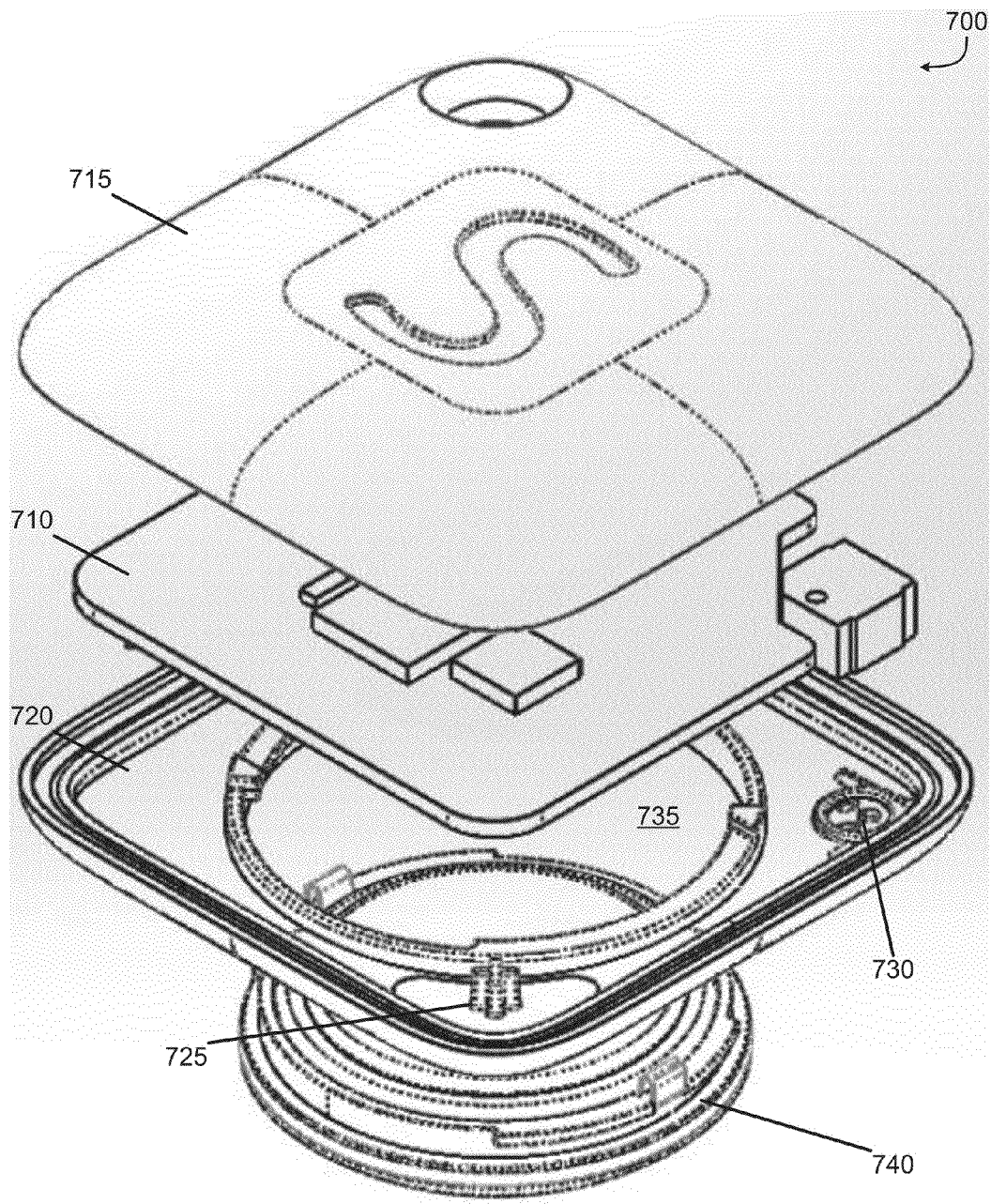

FIG. 7B shows an exploded view of wireless tracking device 700. As shown, internal components 710 can be protected by top casing 715 and bottom casing 720. Internal components 710 can include a combination of electrical components necessary to facilitate the desired functionality of wireless tracking device 700. For example, internal components 710 can include a PC board, processor, input and output components, antenna, battery, etc. An input component can include a pressure sensitive component, such as a switch attached to a PC board, which can be actuated to perform one or more functions. As shown, bottom casing 720 can include button 725 configured to enable a user of wireless tracking device 700 to actuate the pressure sensitive component. An output component can be a speaker and/or integrated buzzer that can cause wireless tracking device 700 to perform an audible sound, vibrate and/or buzz to alert a user. As shown, bottom casing 720 can include sound holes 720 that enable sound to project from wireless tracking device 700. While button 725 and sound holes 730 are shown as part of bottom casing 720, this is just one example and is not meant to be limiting. One skilled in the art that would readily recognize wireless tracking device 700 can be configured in multiple ways and button 725 and sound holes 730 can be incorporate into top casing 715, bottom casing 720 or a combination of the two.

Top casing 715 and bottom casing 720 can create a waterproof seal around internal components 710, thereby protecting internal components 710 from potential water damage. Further, top casing 715 and bottom casing 720 can be covered in a waterproof material, such as rubber.

Bottom casing 720 can include opening 735 which can allow a battery to be inserted and removed from wireless tracking device 700. Covering 740 can be used to seal opening 735.

Figure 7C:
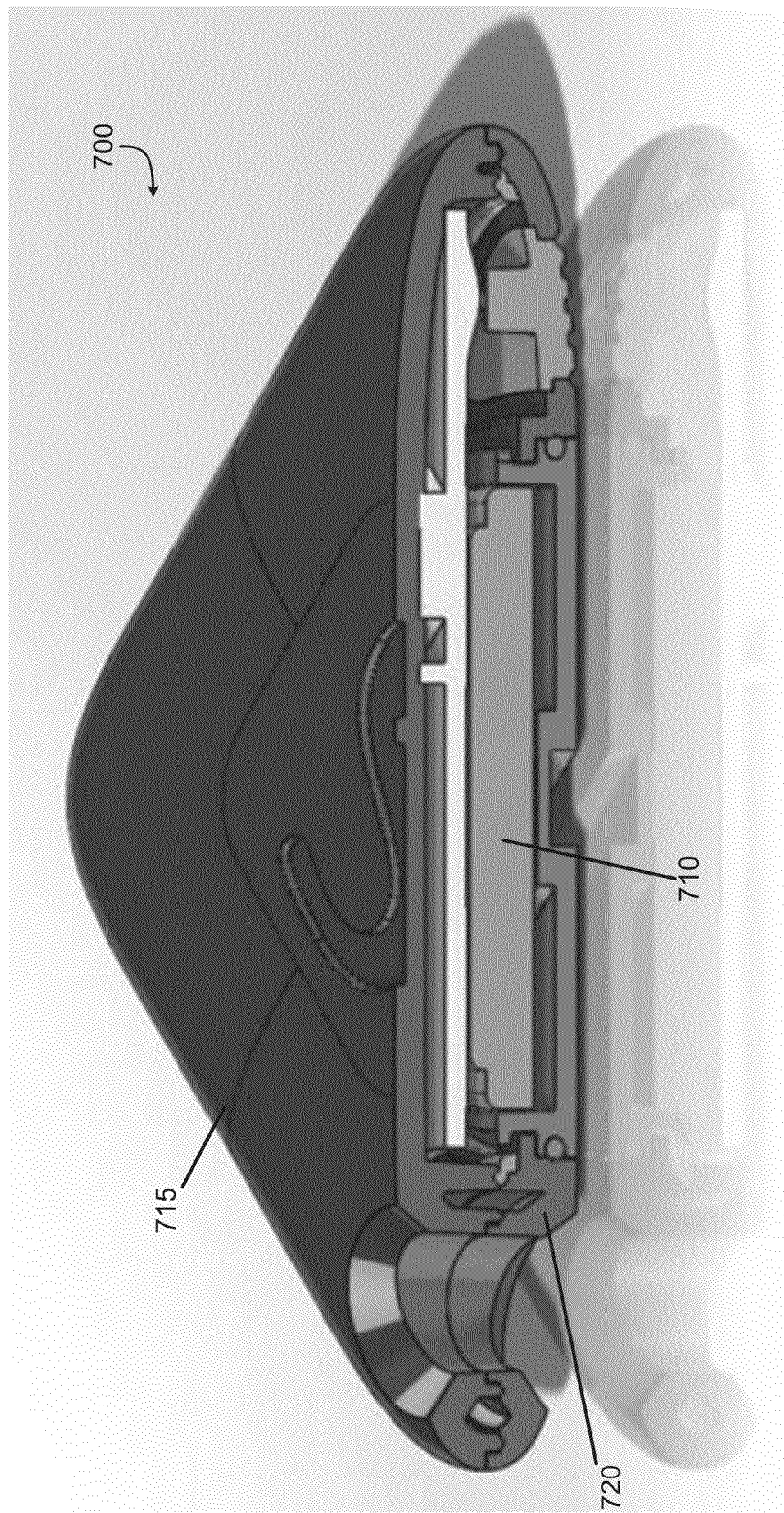

FIG. 7C shows a cross section view of wireless tracking device 700. As show, internal components 710 are encapsulated by top casing 715 and bottom casing 720. In some embodiments, wireless tracking device 700 can be designed to be water-tight to avoid internal components 710 from coming in contact with liquid, which could potentially damage and/or interfere with performance of internal components 710.

Figure 7D:
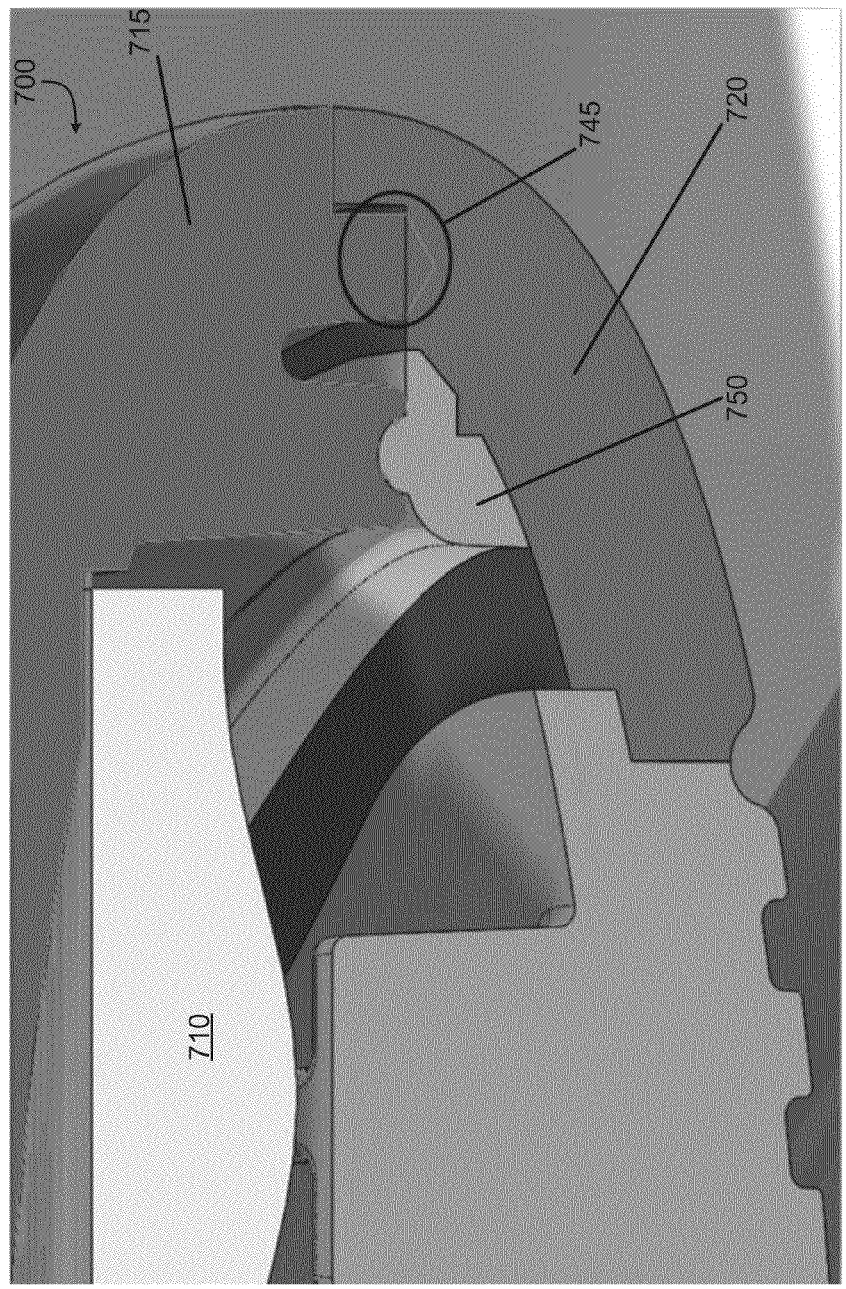

One interface where moisture can potentially intrude on internal components 710 is along the perimeter of wireless tracking device 710 between top casing 715 and bottom casing 720. FIG. 7D shows a cross section view of the perimeter of wireless tracking device 700. As shown, wireless tracking device 700 can be sealed along the perimeter by rigid ultrasonic weld 745 that seals tops top casing 715 to bottom casing 720. Rigid ultrasonic weld 745 can span the entire perimeter of wireless tracking device 700 to create a seal that prevents moisture from entering wireless tracking device 700 and potentially coming into contact with internal components 710.

As a second line of defense against moisture intrusion, wireless tracking device 700 can include perimeter gasket 750. Perimeter gasket 750 can be an elastomeric gasket that sits inboard of rigid ultrasonic weld 745 to prevent moisture intrusion should a portion of rigid ultrasonic weld 745 fail. Perimeter gasket 750 can be elastomeric gasket that spans the entire perimeter of wireless tracking device 700 to create a second seal between top casing 715 and bottom casing 720. Perimeter gasket 750 can be constructed by over-molding the geometry to bottom casing 720. The over-molding process can allow the interface between perimeter gasket 750 and bottom casing 720 to be hermetic, while also closely controlling the geometry and interface between top casing 715 and bottom casing 720.

Figure 7E:
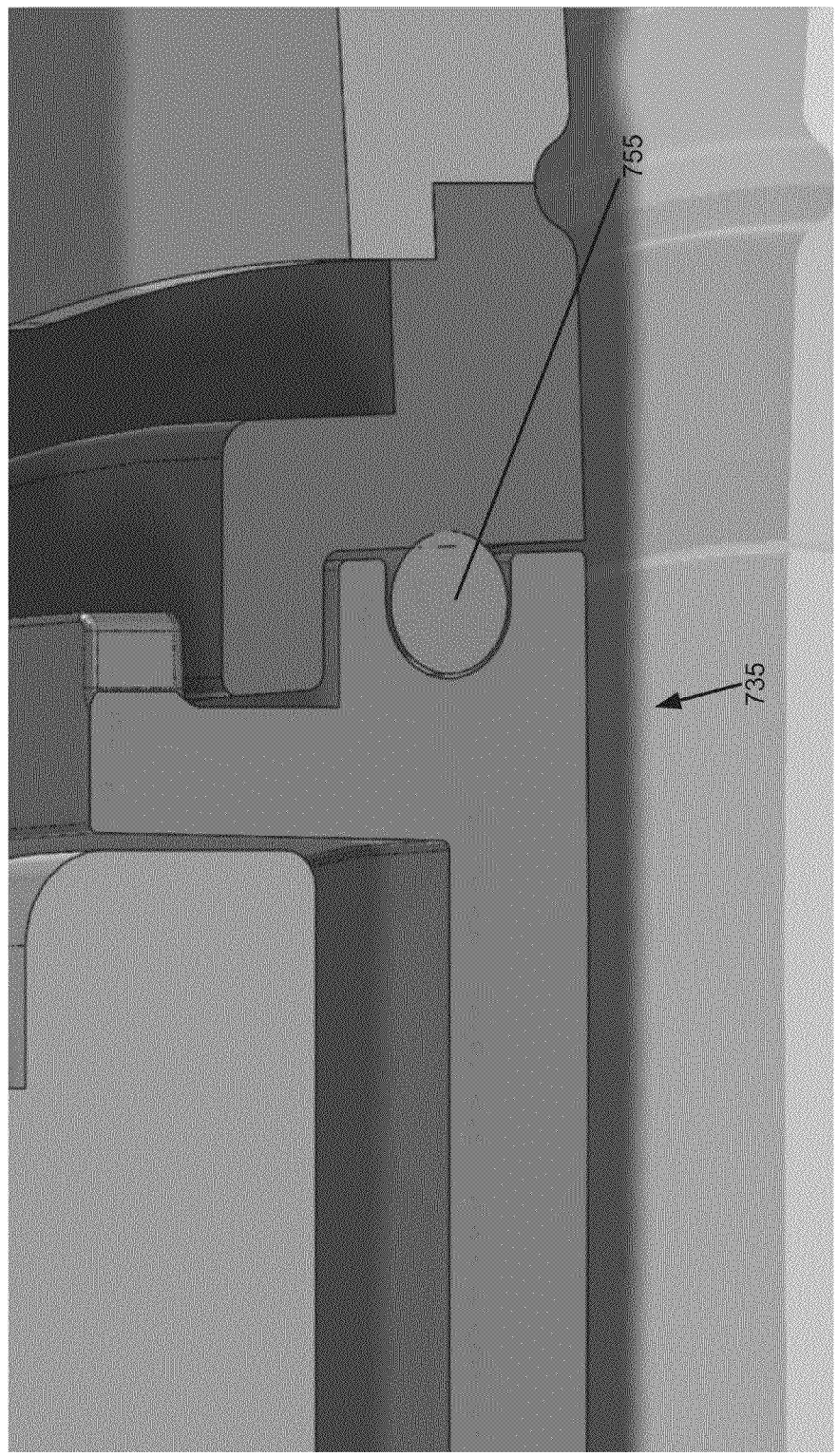

A second interface where moisture can potentially intrude on internal components 710 is along the perimeter of opening 735 between bottom casing 720 and covering 740. FIG. 7E shows a cross section view of wireless tracking device 700 along the perimeter of opening 735. As shown, wireless tracking device 700 can include gasket 755 that spans the entire perimeter of opening 735 to create a seal between bottom casing 720 and covering 740. gasket 755 can be any type of mechanical gasket capable of creating a waterproof seal, such as an O-ring, packing or toric joint.

Figure 7F:
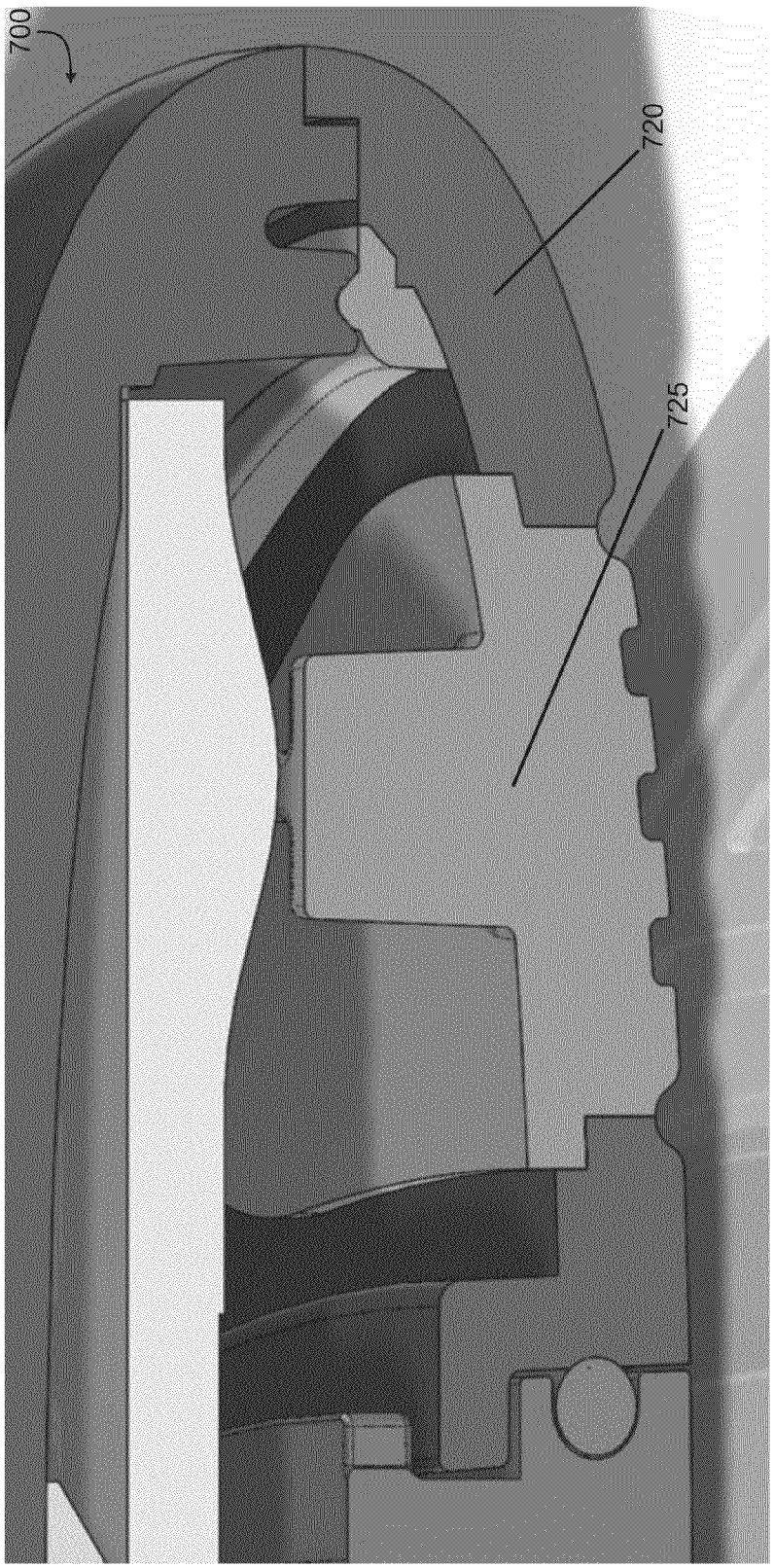

A third interface where moisture can potentially intrude on internal components 710 is along the perimeter of button 725. FIG. 7F shows a cross section view of button 725. Button 725 can be over-molded to bottom casing 720, thereby creating a waterproof seal between button 725 and bottom casing 720 and simplifying the design of wireless tracking device 700.

Figure 7G:
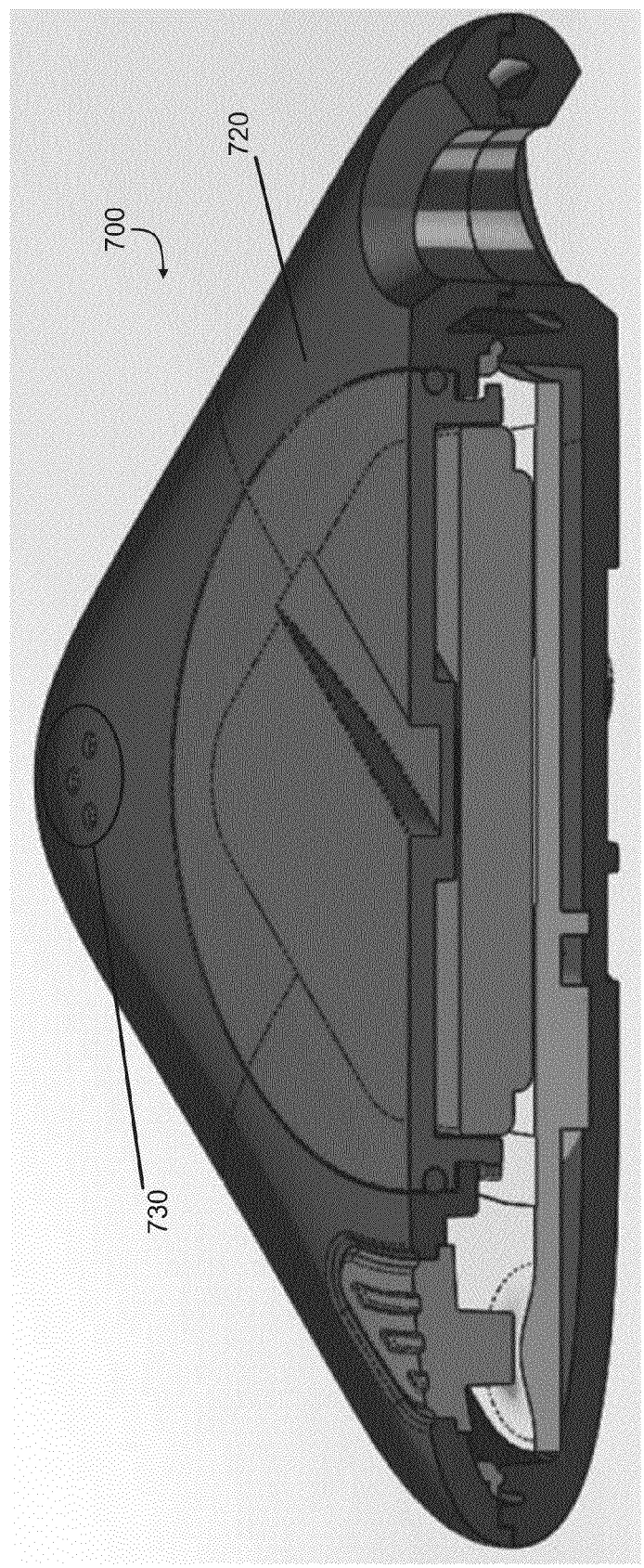
Figure 7H:
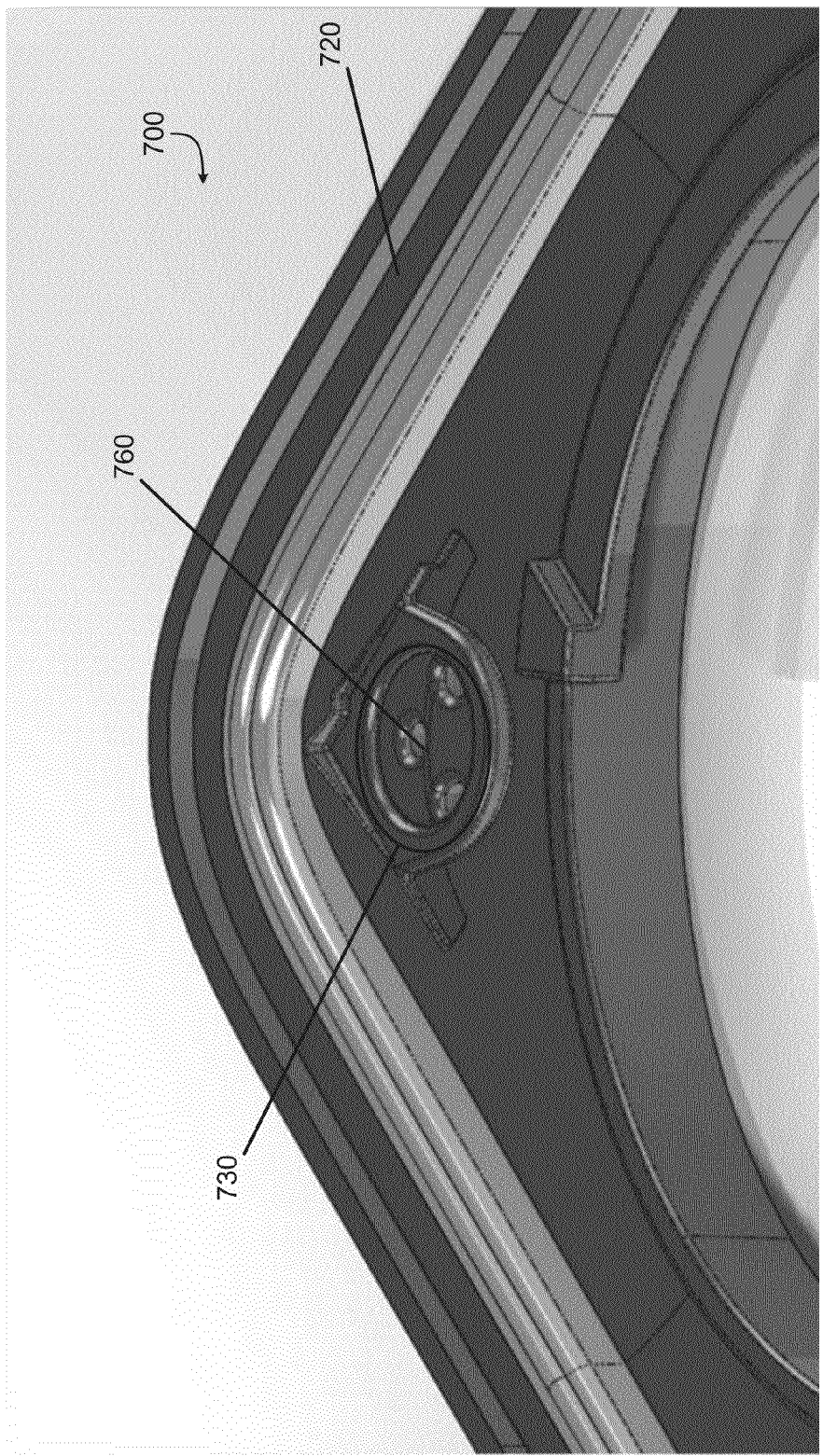

A fourth interface where moisture can potentially intrude on internal components 710 is at sound holes 730. FIG. 7G shows sound holes 730 on the exterior of bottom casing 720. FIG. 7H shows sound holes 730 from the interior of exterior casing 720. To prevent moisture from entering wireless tracking device 700 through sound holes 730, wireless tracking device 700 can include membrane seal 760 that is attached to the interior of bottom casing 720 and covers sound holes 730 to create a seal between sound hole 730 and interior components 710. Membrane seal 760 can be made of any type of waterproof membrane capable of creating an adequate seal to prevent moisture from entering wireless tracking device 700, while allowing sound to escape, such as Gore-Tex®.

Figure 8A:
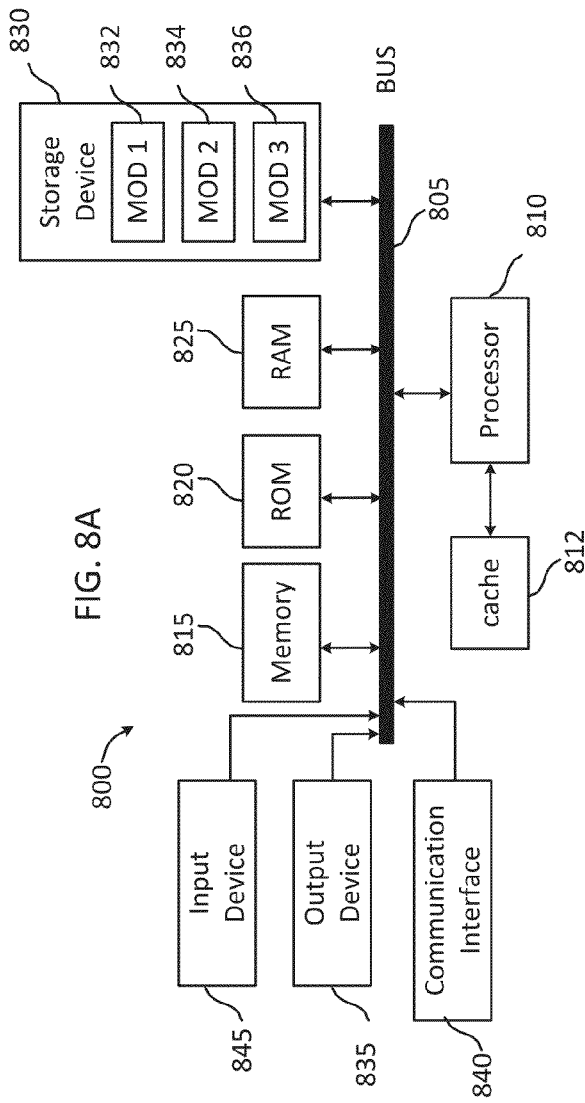
FIGS. 8A and 8B show possible system embodiments.
Figure 8B:
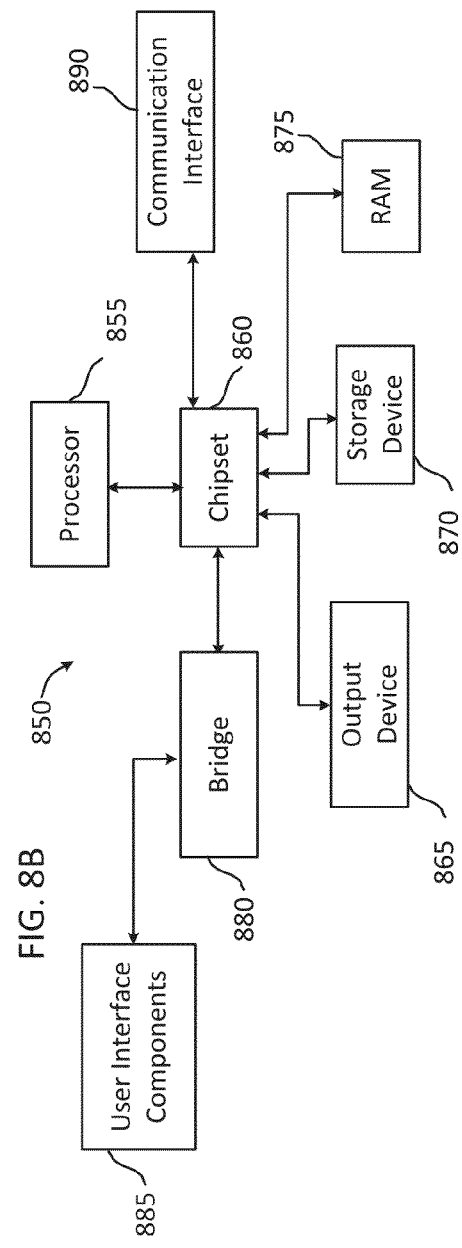

FIG. 8A, and FIG. 8B show possible system embodiments. The more appropriate embodiment will be apparent to those of ordinary skill in the art when practicing the present technology. Persons of ordinary skill in the art will also readily appreciate that other system embodiments are possible.

FIG. 8A illustrates a conventional system bus computing system architecture 800 wherein the components of the system are in electrical communication with each other using a bus 805. Exemplary system 800 includes a processing unit (CPU or processor) 810 and a system bus 805 that couples various system components including the system memory 815, such as read only memory (ROM) 820 and random access memory (RAM) 825, to the processor 810. The system 800 can include a cache of high-speed memory connected directly with, in close proximity to, or integrated as part of the processor 810. The system 800 can copy data from the memory 815 and/or the storage device 830 to the cache 812 for quick access by the processor 810. In this way, the cache can provide a performance boost that avoids processor 810 delays while waiting for data. These and other modules can control or be configured to control the processor 810 to perform various actions. Other system memory 815 may be available for use as well. The memory 815 can include multiple different types of memory with different performance characteristics. The processor 810 can include any general purpose processor and a hardware module or software module, such as module 1 832, module 2 834, and module 3 836 stored in storage device 830, configured to control the processor 810 as well as a special-purpose processor where software instructions are incorporated into the actual processor design. The processor 810 may essentially be a completely self-contained computing system, containing multiple cores or processors, a bus, memory controller, cache, etc. A multi-core processor may be symmetric or asymmetric.

To enable user interaction with the computing device 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with the computing device 800. The communications interface 840 can generally govern and manage the user input and system output. There is no restriction on operating on any particular hardware arrangement and therefore the basic features here may easily be substituted for improved hardware or firmware arrangements as they are developed.

Storage device 830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof.

The storage device 830 can include software modules 832, 834, 836 for controlling the processor 810. Other hardware or software modules are contemplated. The storage device 830 can be connected to the system bus 805. In one aspect, a hardware module that performs a particular function can include the software component stored in a computer-readable medium in connection with the necessary hardware components, such as the processor 810, bus 805, display 835, and so forth, to carry out the function.

FIG. 8B illustrates a computer system 850 having a chipset architecture that can be used in executing the described method and generating and displaying a graphical user interface (GUI). Computer system 850 is an example of computer hardware, software, and firmware that can be used to implement the disclosed technology. System 850 can include a processor 855, representative of any number of physically and/or logically distinct resources capable of executing software, firmware, and hardware configured to perform identified computations. Processor 855 can communicate with a chipset 860 that can control input to and output from processor 855. In this example, chipset 860 outputs information to output 865, such as a display, and can read and write information to storage device 870, which can include magnetic media, and solid state media, for example. Chipset 860 can also read data from and write data to RAM 875. A bridge 880 for interfacing with a variety of user interface components 885 can be provided for interfacing with chipset 860. Such user interface components 885 can include a keyboard, a microphone, touch detection and processing circuitry, a pointing device, such as a mouse, and so on. In general, inputs to system 850 can come from any of a variety of sources, machine generated and/or human generated.

Chipset 860 can also interface with one or more communication interfaces 890 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 855 analyzing data stored in storage 870 or 875. Further, the machine can receive inputs from a user via user interface components 885 and execute appropriate functions, such as browsing functions by interpreting these inputs using processor 855.

It can be appreciated that exemplary systems 800 and 850 can have more than one processor 810 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
  receiving, by a computer processor of a first computing device, a first location request for an estimated location of a target computing device;
  gathering, by the computer processor, a set of signal readings describing wireless communication signals received from the target computing device, each signal reading of the set of signal readings including:
    a signal strength value indicating a strength measurement of a wireless communication signal received from the target computing device,
    a time stamp value indicating a time when the wireless communication signal was received by a receiving computing device, and
    a geographic coordinate value indicating a geographic location of the receiving computing device at the time when the receiving computing device received the wireless communication signal from the target computing device;
  selecting, by the computer processor, at least three signal readings from the set of signal readings, the at least three signal readings including a first signal reading with a first geographic coordinate value and a first time stamp value, and a second signal reading with a second geographic coordinate value and a second time stamp value, wherein the first geographic coordinate value is different than the second geographic coordinate value, the first time stamp value is different than the second time stamp value, and the first signal reading, and the second signal reading both describe wireless communication signals received by the first computing device from the target computing device; and determining, by the computer processor, the estimated location of the target computing device based on the at least three signal readings by using at least a signal strength value of the first signal reading, the first geographic coordinate value of the first signal reading, a signal strength value of the second signal reading, and the second geographic coordinate value of the second signal reading to triangulate the estimated location of the target computing device.

2. The method of claim 1, further comprising:
presenting, on a graphical map interface, the estimated location of the target computing device.

3. The method of claim 1, wherein gathering the set of signal readings describing wireless communication signals received from the target computing device comprises:
gathering, from a local memory of the first computing device, a set of locally stored signal readings describing wireless communication signals received from the target computing device;
transmitting, to a tracking management system, a request for signal readings describing wireless communication signals received from the target computing device; and
receiving, from the tracking management system, a set of cloud stored signal readings describing wireless communication signals received from the target computing device, the set of cloud stored signal readings including at least one signal readings not included in the set of locally stored signal readings, and the at least one signal reading describing a wireless communication signal received from the target computing device by a second computing device, different than the first computing device.

4. The method of claim 1, wherein selecting the at least three signal readings from the set of signal readings comprises:
determining that the timestamp value of the first signal reading is greater than a timestamp value of a third signal reading of the set of signal readings, the third signal reading not included in the set of selected signal readings.

5. The method of claim 1, wherein selecting the at least three signal readings from the set of signal readings comprises:
determining that the first geographic coordinate value of the first signal reading is at least a threshold distance apart from the second geographic coordinate value of the second signal reading.

6. The method of claim 1, further comprising:
receiving a first wireless communication signal from a transmitting computing device;
determining a signal strength value of the first wireless communication signal;
determining a geographic coordinate value indicating the location of the first computing device when the first wireless communication signal was received;
determining a timestamp value indicating a time when the first wireless communication signal was received; and
generating a new signal reading describing the first wireless communication signal.

7. A first computing device comprising:
one or more computer processors; and
a local memory containing instructions that, when executed by the one or more computer processors, cause the first computing device to:
receive a first location request for an estimated location of a target computing device;
gather a set of signal readings describing wireless communication signals received from the target computing device, each signal reading of the set of signal readings including:
a signal strength value indicating a strength measurement of a wireless communication signal received from the target computing device,
a time stamp value indicating a time when the wireless communication signal was received by a receiving computing device, and
a geographic coordinate value indicating a geographic location of the receiving computing device at the time when the receiving computing device received the wireless communication signal from the target computing device;
select at least three signal readings from the set of signal readings, the at least three signal readings including a first signal reading with a first geographic coordinate value and a first time stamp value, and a second signal reading with a second geographic coordinate value and a second time stamp value, wherein the first geographic coordinate value is different than the second geographic coordinate value, the first time stamp value is different than the second time stamp value, and the first signal reading, and the second signal reading both describe wireless communication signals received by the first computing device from the target computing device; and
determine the estimated location of the target computing device based on the at least three signal readings by using at least a signal strength value of the first signal reading, the first geographic coordinate value of the first signal reading, a signal strength value of the second signal reading, and the second geographic coordinate value of the second signal reading to triangulate the estimated location of the target computing device.

8. The system of claim 7, wherein the instructions further cause the first computing device to:
present, on a graphical map interface, the estimated location of the target computing device.

9. The system of claim 7, wherein gathering the set of signal readings describing wireless communication signals received from the target computing device comprises:
gathering, from the local memory, a set of locally stored signal readings describing wireless communication signals received from the target computing device;
transmitting, to a tracking management system, a request for signal readings describing wireless communication signals received from the target computing device; and
receiving, from the tracking management system, a set of cloud stored signal readings describing wireless communication signals received from the target computing device, the set of cloud stored signal readings including at least one signal readings not included in the set of locally stored signal readings, and the at least one signal reading describing a wireless communication signal received from the target computing device by a second computing device, different than the first computing device.

10. The system of claim 7, wherein selecting the at least three signal readings from the set of signal readings comprises:
determining that the timestamp value of the first signal reading is greater than a timestamp value of a third signal reading of the set of signal readings, the third signal reading not included in the set of selected signal readings.

11. The system of claim 7, wherein selecting the at least three signal readings from the set of signal readings comprises:
- determining that the first geographic coordinate value of the first signal reading is at least a threshold distance apart from the second geographic coordinate value of the second signal reading.

12. The system of claim 7, wherein selecting the subset of signal readings from the set of signal readings comprises:
- ranking the first signal reading and the second signal reading signal based on at least one of:
  - the times stamp value of the first signal reading and the time stamp value of the second signal reading,
  - a geographic coordinate value of the first signal reading and a geographic coordinate value of the second signal reading, or
  - a signal strength value of the first signal reading and a signal strength value of the second signal reading, wherein the set of selected signal readings are selected based on the ranking.

13. A non-transitory computer-readable medium containing instructions that, when executed by one or more computer processors of a first computing device, cause the first computing device to:
- receive a first location request for an estimated location of a target computing device;
- gather a set of signal readings describing wireless communication signals received from the target computing device, each signal reading of the set of signal readings including:
  - a signal strength value indicating a strength measurement of a wireless communication signal received from the target computing device,
  - a time stamp value indicating a time when the wireless communication signal was received by a receiving computing device, and
  - a geographic coordinate value indicating a geographic location of the receiving computing device at the time when the receiving computing device received the wireless communication signal from the target computing device;
- select at least three signal readings from the set of signal readings, the at least three signal readings including a first signal reading with a first geographic coordinate value and a first time stamp value, and a second signal reading with a second geographic coordinate value and a second time stamp value, wherein the first geographic coordinate value is different than the second geographic coordinate value, the first time stamp value is different than the second time stamp value, and the first signal reading, and the second signal reading both describe wireless communication signals received by the first computing device from the target computing device; and
- determine the estimated location of the target computing device based on the at least three signal readings by using at least a signal strength value of the first signal reading, the first geographic coordinate value of the first signal reading, a signal strength value of the second signal reading, and the second geographic coordinate value of the second signal reading to triangulate the estimated location of the target computing device.

14. The non-transitory computer-readable medium of claim 13, wherein the instructions further cause the first computing device to:
- present, on a graphical map interface, the estimated location of the target computing device.

15. The non-transitory computer-readable medium of claim 13, wherein gathering the set of signal readings describing wireless communication signals received from the target computing device comprises:
- gathering, from a local memory of the first computing device, a set of locally stored signal readings describing wireless communication signals received from the target computing device;
- transmitting, to a tracking management system, a request for signal readings describing wireless communication signals received from the target computing device; and
- receiving, from the tracking management system, a set of cloud stored signal readings describing wireless communication signals received from the target computing device, the set of cloud stored signal readings including at least one signal readings not included in the set of locally stored signal readings, and the at least one signal reading describing a wireless communication signal received from the target computing device by a second computing device, different than the first computing device.

16. The non-transitory computer-readable medium of claim 13, wherein selecting the at least three signal readings from the set of signal readings comprises:
- determining that the timestamp value of the first signal reading is greater than a timestamp value of a third signal reading of the set of signal readings, the third signal reading not included in the set of selected signal readings.

17. The non-transitory computer-readable medium of claim 13, wherein selecting the at least three signal readings from the set of signal readings comprises:
- determining that the first geographic coordinate value of the first signal reading is at least a threshold distance apart from the second geographic coordinate value of the second signal reading.

18. The non-transitory computer-readable medium of claim 13, wherein selecting the subset of signal readings from the set of signal readings comprises:
- ranking the first signal reading and the second signal reading signal based on at least one of:
  - the times stamp value of the first signal reading and the time stamp value of the second signal reading,
  - a geographic coordinate value of the first signal reading and a geographic coordinate value of the second signal reading, or
  - a signal strength value of the first signal reading and a signal strength value of the second signal reading, wherein the set of selected signal readings are selected based on the ranking.

* * * * *